(12) United States Patent
Lake et al.

(10) Patent No.: US 12,263,400 B2
(45) Date of Patent: Apr. 1, 2025

(54) OPEN AND CLOSE FEATURES FOR GAME CONTROLLER BRIDGE

(71) Applicant: Backbone Labs, Inc., Vancouver, WA (US)

(72) Inventors: Jon Christopher Lake, Sunnyvale, CA (US); Wei-Jun Wang, Menlo Park, CA (US); Ozhan Maker, San Diego, CA (US); Maneet Singh Khaira, Vancouver, WA (US); Cory Newton, Redwood City, CA (US); Zachary Scott, Palo Alto, CA (US); Eric Sorensen, Portland, OR (US)

(73) Assignee: Backbone Labs, Inc., Vancouver, WA (US)

( * ) Notice: Subject to any disclaimer, the term of this patent is extended or adjusted under 35 U.S.C. 154(b) by 0 days.

(21) Appl. No.: 18/405,077

(22) Filed: Jan. 5, 2024

(65) Prior Publication Data

US 2024/0226721 A1   Jul. 11, 2024

Related U.S. Application Data

(60) Provisional application No. 63/437,580, filed on Jan. 6, 2023.

(51) Int. Cl.
*A63F 13/24* (2014.01)
*A63F 13/23* (2014.01)

(52) U.S. Cl.
CPC .............. *A63F 13/24* (2014.09); *A63F 13/23* (2014.09)

(58) Field of Classification Search
CPC ........... A63F 13/22; A63F 13/23; A63F 13/24
See application file for complete search history.

(56) References Cited

U.S. PATENT DOCUMENTS

| | | | |
|---|---|---|---|
| 4,636,593 A | 1/1987 | Novak |
| 6,238,289 B1 | 5/2001 | Sobota |
| 6,640,268 B1 | 10/2003 | Kumar |
| 6,684,062 B1 | 1/2004 | Gosior |
| 6,761,462 B2 | 7/2004 | Yoshida |
| 6,965,368 B1 | 11/2005 | Andrews et al. |
| 7,477,239 B2 | 1/2009 | Ray |
| 7,580,728 B2 | 8/2009 | Vance et al. |
| 7,905,627 B2 | 3/2011 | Chiang |
| 8,462,810 B2 | 6/2013 | Spinar |
| 8,760,394 B2 | 6/2014 | Chiang |
| 8,822,851 B2 | 9/2014 | Walker |

(Continued)

FOREIGN PATENT DOCUMENTS

| | | |
|---|---|---|
| CA | 3169951 A1 | 9/2021 |
| CN | 101739162 A | 6/2010 |

(Continued)

OTHER PUBLICATIONS

US 12,029,974 B1, 07/2024, Maker (withdrawn)

(Continued)

*Primary Examiner* — Omkar A Deodhar
*Assistant Examiner* — Shauna-Kay Hall
(74) *Attorney, Agent, or Firm* — Crowell & Moring LLP

(57) ABSTRACT

A handheld gaming device in which configurations allow for default-open, force-close systems and separate the user's insertion of the mobile device and closure of the handles around the mobile device.

29 Claims, 12 Drawing Sheets

(56) References Cited

U.S. PATENT DOCUMENTS

| | | |
|---|---|---|
| 9,053,243 B2 | 6/2015 | Townsend |
| 9,677,740 B2 | 6/2017 | Steiner |
| 10,025,644 B2 | 7/2018 | Iwaya et al. |
| 10,258,876 B2 | 4/2019 | Wells et al. |
| 10,259,384 B2 | 4/2019 | Teng |
| 10,300,386 B1 | 5/2019 | Leung et al. |
| 10,391,393 B2* | 8/2019 | Townley ............... A63F 13/24 |
| 10,483,969 B2 | 11/2019 | Kontani |
| 10,599,233 B1 | 3/2020 | Amalou |
| 10,725,557 B2 | 7/2020 | Kontani |
| 10,741,215 B1 | 8/2020 | Sundareson |
| 10,868,436 B1 | 12/2020 | Chen |
| 11,000,759 B2 | 5/2021 | Palmer et al. |
| 11,027,191 B2* | 6/2021 | Oh ............... A63F 13/98 |
| 11,090,557 B2 | 8/2021 | Downs et al. |
| 11,105,969 B2 | 8/2021 | Sasagawa |
| 11,167,209 B2* | 11/2021 | Lu ............... A63F 13/98 |
| 11,389,721 B2 | 7/2022 | Khaira et al. |
| 11,395,961 B2* | 7/2022 | Chung ............... A63F 13/235 |
| 11,662,855 B1 | 5/2023 | Sorensen et al. |
| 11,707,670 B2 | 7/2023 | Khaira et al. |
| 11,819,756 B2* | 11/2023 | Lu ............... A63F 13/23 |
| 11,826,642 B2 | 11/2023 | Khaira et al. |
| 11,839,810 B2 | 12/2023 | Khaira et al. |
| 11,853,505 B1 | 12/2023 | Sorensen et al. |
| 12,070,678 B2 | 8/2024 | Maker |
| 12,074,946 B2 | 8/2024 | Wei et al. |
| 12,115,443 B2 | 10/2024 | Khaira et al. |
| 12,121,800 B2 | 10/2024 | Maker |
| 12,145,052 B2 | 11/2024 | Khaira et al. |
| 12,145,053 B2 | 11/2024 | Khaira et al. |
| 2002/0173354 A1 | 11/2002 | Winans |
| 2005/0017953 A1 | 1/2005 | Pekka |
| 2005/0172045 A1 | 8/2005 | Bermudez et al. |
| 2005/0243585 A1 | 11/2005 | Marchant |
| 2005/0247550 A1 | 11/2005 | Hamada |
| 2006/0132458 A1 | 6/2006 | Garfio |
| 2006/0234794 A1 | 10/2006 | Baseflug et al. |
| 2006/0236002 A1 | 10/2006 | Valenci |
| 2007/0152965 A1 | 7/2007 | Krzyzanowski |
| 2007/0155511 A1 | 7/2007 | Grundstedt |
| 2007/0236959 A1 | 10/2007 | Tolbert |
| 2008/0202907 A1 | 8/2008 | Kyowski |
| 2008/0294453 A1 | 11/2008 | Baird-Smith |
| 2009/0065337 A1 | 3/2009 | Chiang |
| 2009/0077277 A1 | 3/2009 | Vidal |
| 2009/0219734 A1 | 9/2009 | Sawada |
| 2009/0284397 A1 | 11/2009 | Lee |
| 2010/0067424 A1 | 3/2010 | Sun |
| 2010/0115050 A1 | 5/2010 | Sultenfuss |
| 2010/0137033 A1 | 6/2010 | Lee |
| 2010/0271839 A1 | 10/2010 | Chan |
| 2011/0014984 A1 | 1/2011 | Penman et al. |
| 2011/0084904 A1 | 4/2011 | Tan |
| 2012/0145522 A1 | 6/2012 | Lee |
| 2012/0200475 A1 | 8/2012 | Baker |
| 2012/0225258 A1 | 9/2012 | Hill |
| 2013/0033829 A1 | 2/2013 | Furubo et al. |
| 2013/0077346 A1 | 3/2013 | Chen |
| 2013/0191625 A1 | 7/2013 | Mullens et al. |
| 2013/0225288 A1 | 8/2013 | Levin et al. |
| 2013/0237322 A1 | 9/2013 | Sobel |
| 2014/0018173 A1 | 1/2014 | Urhman |
| 2014/0024392 A1 | 1/2014 | Su |
| 2014/0125619 A1 | 5/2014 | Panther et al. |
| 2014/0161417 A1 | 6/2014 | Kurupacheril |
| 2014/0184508 A1 | 7/2014 | Tamasi et al. |
| 2014/0274394 A1 | 9/2014 | Willis |
| 2014/0304494 A1 | 10/2014 | Hawver |
| 2014/0317329 A1 | 10/2014 | Barnett et al. |
| 2014/0375545 A1 | 12/2014 | Ackerman et al. |
| 2015/0018101 A1 | 1/2015 | Schoenith |
| 2015/0031452 A1 | 1/2015 | Rundell |
| 2015/0128042 A1 | 5/2015 | Churchill et al. |
| 2015/0217191 A1 | 8/2015 | Yan |
| 2015/0273325 A1* | 10/2015 | Falc ............... A63F 13/24 463/37 |
| 2015/0281422 A1 | 10/2015 | Kessler et al. |
| 2016/0132114 A1 | 5/2016 | Rihn |
| 2016/0180811 A1 | 6/2016 | Colenbrander |
| 2016/0317919 A1 | 11/2016 | Gassoway et al. |
| 2016/0329533 A1 | 11/2016 | Tajima |
| 2017/0056762 A1* | 3/2017 | Gafni ............... A63F 13/235 |
| 2017/0205881 A1 | 7/2017 | Yamashita |
| 2018/0004250 A1 | 1/2018 | Barnett et al. |
| 2018/0056176 A1 | 3/2018 | Sakamoto |
| 2018/0133594 A1 | 5/2018 | Guo |
| 2018/0250588 A1 | 9/2018 | Winick |
| 2018/0345136 A1 | 12/2018 | Schmitz et al. |
| 2018/0369692 A1 | 12/2018 | Winick |
| 2019/0079584 A1 | 3/2019 | Bonanno et al. |
| 2019/0080549 A1 | 3/2019 | Lewis |
| 2019/0230400 A1 | 7/2019 | Van Os Marcel |
| 2019/0358534 A1 | 11/2019 | Fang et al. |
| 2019/0379231 A1 | 12/2019 | Gonzalez et al. |
| 2020/0155928 A1 | 5/2020 | Guo |
| 2020/0206636 A1 | 7/2020 | Schultz et al. |
| 2020/0278758 A1 | 9/2020 | McAllen |
| 2020/0282309 A1 | 9/2020 | Liao |
| 2020/0353351 A1 | 11/2020 | Mao |
| 2020/0353369 A1 | 11/2020 | Esselstrom |
| 2020/0406140 A1 | 12/2020 | Sundareson |
| 2021/0093951 A1 | 4/2021 | Mahlmeister et al. |
| 2021/0104907 A1 | 4/2021 | Chen |
| 2021/0154584 A1 | 5/2021 | O'Connor et al. |
| 2021/0197082 A1 | 7/2021 | Seibert et al. |
| 2021/0205699 A1* | 7/2021 | Chung ............... A63F 13/24 |
| 2021/0275907 A1* | 9/2021 | Khaira ............... A63F 13/92 |
| 2021/0308566 A1 | 10/2021 | Kong et al. |
| 2022/0032178 A1 | 2/2022 | Khaira et al. |
| 2022/0032179 A1 | 2/2022 | Khaira et al. |
| 2022/0032180 A1 | 2/2022 | Khaira et al. |
| 2022/0096923 A1 | 3/2022 | O'Leary et al. |
| 2022/0135273 A1 | 5/2022 | Malone |
| 2022/0317798 A1 | 10/2022 | Stryker |
| 2022/0323857 A1 | 10/2022 | Khaira et al. |
| 2022/0331688 A1 | 10/2022 | Khaira et al. |
| 2022/0339533 A1 | 10/2022 | Schoenith |
| 2022/0347563 A1 | 11/2022 | Khaira et al. |
| 2022/0347564 A1 | 11/2022 | Khaira et al. |
| 2022/0382559 A1 | 12/2022 | Tu et al. |
| 2022/0395754 A1 | 12/2022 | Ballard |
| 2023/0271082 A1 | 8/2023 | Khaira et al. |
| 2023/0356076 A1 | 11/2023 | Maker |
| 2024/0149148 A1 | 5/2024 | O'Connor |
| 2024/0149151 A1 | 5/2024 | Chow |
| 2024/0149163 A1 | 5/2024 | O'Connor |
| 2024/0149174 A1 | 5/2024 | Donlan |
| 2024/0155033 A1 | 5/2024 | Wei |
| 2024/0157258 A1 | 5/2024 | Maker |
| 2024/0207721 A1 | 6/2024 | O'Connor |
| 2024/0207722 A1 | 6/2024 | Maker |
| 2024/0207723 A1 | 6/2024 | Maker |
| 2024/0207724 A1 | 6/2024 | O'Connor |
| 2024/0207725 A1 | 6/2024 | O'Connor |
| 2024/0226721 A1 | 7/2024 | Lake et al. |
| 2024/0307760 A1 | 9/2024 | Aldridge et al. |
| 2024/0333804 A1 | 10/2024 | Wei et al. |

FOREIGN PATENT DOCUMENTS

| | | |
|---|---|---|
| CN | 204129699 U | 1/2015 |
| CN | 106356228 A | 1/2017 |
| CN | 107008005 A | 8/2017 |
| CN | 207532765 U | 6/2018 |
| CN | 207838250 U | 9/2018 |
| CN | 208115138 U | 11/2018 |
| CN | 208636809 U | 3/2019 |
| CN | 209392718 U | 9/2019 |
| CN | 113426104 A | 9/2021 |
| CN | 115427123 A | 12/2022 |
| CN | 115427123 B | 2/2024 |
| EP | 1380324 A1 | 1/2004 |
| EP | 1380324 B1 | 9/2005 |

(56) References Cited

FOREIGN PATENT DOCUMENTS

| | | |
|---|---|---|
| EP | 2025369 A2 | 2/2009 |
| EP | 2136225 A1 | 12/2009 |
| EP | 2136225 B1 | 6/2012 |
| EP | 4114540 A1 | 1/2023 |
| GB | 2608588 A | 1/2023 |
| JP | 2004139847 A | 5/2004 |
| JP | 2014210079 A | 11/2014 |
| JP | 2023516421 A | 4/2023 |
| TW | 201036020 A | 10/2010 |
| WO | WO2009/073819 | 6/2009 |
| WO | WO2015/072625 | 5/2015 |
| WO | WO2017/218303 | 12/2017 |
| WO | WO2021/102146 A1 | 5/2021 |
| WO | WO2021/178242 A1 | 9/2021 |
| WO | WO2022/161834 A1 | 8/2022 |
| WO | WO 2023/034596 A1 | 3/2023 |
| WO | WO2023/172202 A1 | 9/2023 |
| WO | WO2024/006587 A1 | 1/2024 |
| WO | WO2024/097301 A1 | 5/2024 |
| WO | WO2024/107651 A1 | 5/2024 |
| WO | WO2024/107654 A2 | 5/2024 |
| WO | WO2024/137106 A1 | 6/2024 |
| WO | WO2024/148214 A1 | 7/2024 |

OTHER PUBLICATIONS

US 12,047,455 B2, 07/2024, Wei et al. (withdrawn)
U.S. Appl. No. 16/693,080, filed Nov. 2019, O'Connor.
U.S. Appl. No. 16/808,339, filed Mar. 2020, Khaira et al.
U.S. Appl. No. 17/504,260, filed Oct. 2021, Khaira.
U.S. Appl. No. 17/504,283, filed Oct. 2021, Khaira et al.
U.S. Appl. No. 17/504,299, filed Oct. 2021, Khaira.
U.S. Appl. No. 17/850,912, filed Jul. 2022, Khaira.
U.S. Appl. No. 17/856,895, filed Jul. 2022, Khaira.
U.S. Appl. No. 17/866,166, filed Jul. 2022, Khaira et al.
U.S. Appl. No. 17/866,234, filed Jul. 2022, Khaira et al.
U.S. Appl. No. 17/987,772, filed Nov. 2022, Sorensen.
U.S. Appl. No. 18/076,121, filed Dec. 2022, Donlan et al.
U.S. Appl. No. 18/076,146, filed Dec. 2022, Wei et al.
U.S. Appl. No. 18/076,172, filed Dec. 2022, Chow et al.
U.S. Appl. No. 18/086,077, filed Dec. 2022, Maker.
U.S. Appl. No. 18/086,103, filed Dec. 2022, Maker.
U.S. Appl. No. 18/136,509, filed Apr. 2023, O'Connor.
U.S. Appl. No. 18/138,377, filed Apr. 2023, Sorensen et al.
U.S. Appl. No. 18/195,152, filed May 2023, Khaira.
U.S. Appl. No. 18/202,755, filed May 2023, Aldridge et al.
U.S. Appl. No. 18/214,917, filed Jun. 2023, O'Connor.
U.S. Appl. No. 18/214,949, filed Jun. 2023, O'Connor.
U.S. Appl. No. 18,224,508, filed Jul. 2023, Maker.
U.S. Appl. No. 18/226,883, filed Jul. 2023, Khaira et al.
U.S. Appl. No. 18/226,892, filed Jul. 2023, Boegli.
U.S. Appl. No. 18/237,680, filed Aug. 2023, O'Connor.
U.S. Appl. No. 18/237,698, filed Aug. 2023, O'Connor.
U.S. Appl. No. 18/242,672, filed Sep. 2023, Aldridge et al.
U.S. Appl. No. 18/369,000, filed Sep. 2023, Koch et al.
U.S. Appl. No. 18/369,025, filed Sep. 2023, Koch et al.
U.S. Appl. No. 18/388,631, filed Nov. 2023, Khaira et al.
U.S. Appl. No. 18/388,636, filed Nov. 2023, Khaira et al.
U.S. Appl. No. 18/388,922, filed Nov. 2023, O'Connor et al.
U.S. Appl. No. 18/389,063, filed Nov. 2023, Maker et al.
U.S. Appl. No. 63/422,797, filed Nov. 2022, Khaira et al.
U.S. Appl. No. 63/425,655, filed Nov. 2022, Maker et al.
U.S. Appl. No. 63/435,089, filed Dec. 2022, O'Connor.
U.S. Appl. No. 63/437,580, filed Jan. 2023, Lake et al.
U.S. Appl. No. 63/452,551, filed Mar. 2023, Aldridge et al.
U.S. Appl. No. 63/524,014, filed Jun. 2023, O'Connor.
U.S. Appl. No. 63/530,230, filed Aug. 2023, Khaira et al.
U.S. Appl. No. 63/533,580, filed Aug. 2023, Khaira et al.
Office Action in CN Application No. 202180019131.2, dated Jul. 27, 2023.
Office Action in CN Application No. 202180019131.2, dated Mar. 28, 2023.
Office Action—Communication pursuant to Rules 161(1) and 162 EPC, dated Oct. 26, 2022.
Notice of allowance in U.S. Appl. No. 18/224,508, dated Jan. 24, 2024.
Office Action in U.S. Appl. No. 16/693,080, dated Jan. 25, 2021.
Office Action in U.S. Appl. No. 16/693,080, dated Jun. 8, 2021.
Office Action in U.S. Appl. No. 17/504,283, dated Feb. 13, 2024.
Office Action in U.S. Appl. No. 17/856,895, dated Jul. 18, 2023.
Office Action in U.S. Appl. No. 17/856,895, dated Nov. 1, 2023.
Office Action in U.S. Appl. No. 17/856,895, dated Oct. 27, 2022.
Office Action in U.S. Appl. No. 18/076,146, dated Dec. 12, 2023.
Office Action in U.S. Appl. No. 18/086,077, dated Apr. 17, 2023.
Office Action in U.S. Appl. No. 18/086,077, dated Aug. 17, 2023.
Office Action in U.S. Appl. No. 18/086,103, dated Dec. 7, 2023.
Office Action in U.S. Appl. No. 18/195,152, dated Aug. 4, 2023.
Office Action in U.S. Appl. No. 18/224,508, dated Oct. 3, 2023.
International Search Report and Written Opinion of the International Searching Authority issued in International Application No. PCT/US2021/019941, mailed Jun. 9, 2021 (12 pages).
International Search Report and Written Opinion of the International Searching Authority issued in International Application No. PCT/US2023/031919, mailed Nov. 17, 2023 (14 pages).
International Search Report and Written Opinion of the International Searching Authority, issued in International Application No. PCT/US2020/061291, mailed Feb. 24, 2021, 20 pages.
"AVPictureInPictureController: A controller that responds to user-initiated Picture in Picture playback of video in a floating, resizable window"; Apple Developer Documentation, AVKit; downloaded from the Internet on Nov. 27, 2022 at https://developer.apple.com/documentation/avkit/avpictureinpicturecontroller; Apple Inc.; 2022; 8 pages.
"Backbone—Next-Level Play"; Apple App Store preview; downloaded from the Internet on Nov. 29, 2022 at https://apps.apple.com/us/app/backbone-next-level-play/id1449660663; Apple Inc.; 2022; 4 pages.
"Backbone One"; Mobile gaming hardware product page; Backbone; Dec. 9, 2022; 7 pages.
"Digital Depth: All Controller Universal & Fully Customizable"; Kickstarter project page for customizable game controller; Digital Depth Inc.; Aug. 4, 2021; 25 pages.
"Displaying live data with Live Activities"; Apple Developer Documentation Activity Kit article; downloaded from the Internet on Nov. 28, 2022 at https://developer.apple.com/documentation/activitykit/displaying-live-data-with-live-activities; Apple Inc.; 2022; 37 pages.
"Game Center"; Apple Developer Game Center overview; downloaded from the Internet on Nov. 29, 2022 at https://developer.apple.com/game-center/; Apple Inc.; 2022; 4 pages.
"Gamepass App now supports Picture in Picture"; Reddit, xcloud comments; downloaded from the Internet on Nov. 28, 2022 at https://www.reddit.com/r/xcloud/comments/mvathi/gamepass_app_now_supports_picture_in_picture/; Reddit Inc.; 2022; 6 pages.
"GitHub—Kofktu/PIPKit: Picture in Picture for IOS"; downloaded from the Internet on Nov. 27, 2022 at https://github.com/Kofktu/PIPKit; GitHub, Inc.; 2022; 11 pages.
"How to implement Picture in Picture Webview on IOS Swift?"; StackOverflow Questions; downloaded from the Internet on Nov. 28, 2022 at https://stackoverflow.com/questions/69565199/how-to-implement-picture-in-picture-webview-on-ios-swift; StackOverflow; Oct. 14, 2021; 2 pages.
"PhoneJoy Play: Turn your phone into a console!"; Kickstarter project page for compact gamepad; PhoneJoy Solutions America, Inc.; Jul. 29, 2014; 42 pages.
"Picture-in-picture (PiP) support"; Android Developers UI Guide; downloaded from the Internet on Nov. 27, 2022 at https://developer.android.com/develop/ui/views/picture-in-picture; Nov. 11, 2022; 10 pages.
"Picture-in-Picture API—Web APIs / MDN"; downloaded from the Internet on Nov. 27, 2022 at https://developer.mozilla.org/en-us/docs/Web/API/Picture-in-Picture_API; Mozilla Corporation; Oct. 10, 2022; 4 pages.

(56) References Cited

OTHER PUBLICATIONS

"Pip (picture in picture) mode on android with the xbox game pass beta app"; Reddit, XboxGamePass comments; downloaded from the Internet on Nov. 29, 2022 at https://www.reddit.com/r/XboxGamePass/comments/n7f5bk/pip_picture_in_picture_mode_on_android_with_the/; Reddit Inc.; 2022; 6 pages.

"Rayz Pro"; Pioneer Rayz™ Pro earbuds product page; downloaded from the Internet on Aug. 16, 2023 at Rayz Pro Earphone—Pioneer Rayz; Pioneer Rayz; 2023; 9 pages.

"User Notifications: Push user-facing notifications to the user's device from a server, or generate them locally from your app"; Apple Developer Documentation; downloaded from the Internet on Nov. 28, 2022 at https://developer.apple.com/documentation/usernotifications; 2022; 16 pages.

"Why queue in geforce now so long? I try to answer for this question" Reddit, GeForceNOW comments; downloaded from the Internet on Jun. 7, 2023 at why queue in geforce now so long? I try to answer for this question : r/GeForceNOW (reddit.com); Reddit Inc.; Jun. 1, 2023; 6 pages.

Adler, M.; "Backbone One Review: Mobile gaming reenvisioned"; IGN review; downloaded from the Internet on Nov. 29, 2022 at https://www.ign.com/articles/backbone-one-review; IGN; Nov. 7, 2021; 18 pages.

Box.co.uk; "How Does the Samsung Gaming Hub Work?"; YouTube product tutorial; downloaded from the Internet on Nov. 29, 2022 at https://www.youtube.com/watch?v=uAT4tZR3mNk; YouTube; Oct. 2022; 5 pages.

Dickinson, "Instant Replay: Building a Game Engine with Reproducible Behavior," Jul. 13, 2001, Retrieved from the Internet: URL: http://www.gamasutra.com/features/20010713/dickinson_01.htm [retrieved on Oct. 2, 2007], 6 pages.

Faulkner, C.; "Backbone's excellent phone controller is now shipping for Android" The Verge, entertainment tech review webpage; downloaded from the Internet on Nov. 29, 2022 at https://www.theverge.com/2022/11/16/23462127/backbone-one-phone-controller-android-usb-c-features; Vox Media LLC; Nov. 16, 2022; 20 pages.

Faulkner, C.; "The Backbone One is a stunning controller that turns your iPhone into a more capable gaming device"; The Verge, entertainment tech review webpage; downloaded from the Internet on Nov. 29, 2022 at https://www.theverge.com/21525741/backbone-one-iphone-ios-controller-gaming-portable-review; Vox Media LLC; Apr. 27, 2021; 12 pages.

Hinton, L.; "Xbox Cloud Gaming 'Lots of people are playing' Fix: Why is queue taking so long? and How to fix Xbox Cloud Gaming 'Lots of people are playing' error"; downloaded from the Internet on Jun. 7, 2023 at Xbox Cloud Gaming 'Lots of people are playing' Fix: Why is queue taking so long?—GameRevolution; Game Revolution; Dec. 13, 2021; 6 pages.

Max Tech; Backbone One Review—The Best iPhone Gaming Controller!; YouTube product review video; downloaded from the Internet on Nov. 29, 2022 at https://www.youtube.com/watch?v=zRJQjt2nzDo; YouTube; Jun. 2022; 4 pages.

Osterberg, J.; "Picture in Picture Across All Platforms"; Kodeco / iOS & Swift Tutorials; downloaded from the Internet on Nov. 28, 2022 at https://www.kodeco.com/24247382-picture-in-picture-across-all-platforms; Jul. 26, 2021; 14 pages.

Schofield, T.; "Logitech G Cloud Unboxing and Hands on!"; YouTube product review video; downloaded from the Internet on Nov. 29, 2022 at https://www.youtube.com/watch?v=speoPL5vqX0; YouTube; Nov. 2022; 3 pages.

Sholtz, M.; "The Razer Kishi V2 offers a new Virtual Controller mode, and it's pretty slick"; Android Police Newsletter article; downloaded from the Internet on Aug. 16, 2023 at the Razer Kishi V2 offers a new Virtual Controller mode, and it's pretty slick (androidpolice.com); Jan. 21, 2023; 7 pages.

Tech & Design; "How to Set up New Nintendo Switch | Beginners Guide | First Time Turning On"; YouTube product review video; downloaded from the Internet on Nov. 29, 2022 at https://www.youtube.com/watch?v=XtMcQ9IAkCc; YouTube; 2021; 4 pages.

Vinyals et al., "Grandmaster level in StarCraft II using multi-agent reinforcement learning," Nature, Macmillan Journals Ltd., London, vol. 575, No. 7782, Oct. 30, 2019, pp. 350-354, 22 pages.

Voorhees, J.; "Deeper Controller Support and a Revitalized Game Center: Exploring Apple's 2020 Gaming Updates"; MacStories Weekly Extras; downloaded from the Internet on Nov. 29, 2022 at https://www.macstories.net/stories/deeper-controller-support-and-a-revitalized-game-center-exploring-apples-2020-gaming-updates/; MacStories, Inc.; Aug. 27, 2020; 14 pages.

Wagner, "Developing Your Own Replay System," Feb. 4, 2004, Retrieved from the Internet: URL: http://www.Jamasutra.com/features/20040204/wagner_01.shtml [retrieved on Oct. 9, 2007], 11 pages.

Notice of allowance in U.S. Appl. No. 17/504,299, dated Apr. 15, 2024.

Notice of allowance in U.S. Appl. No. 18/076,146, dated Apr. 15, 2024.

Notice of allowance in U.S. Appl. No. 18/086,103, dated Mar. 25, 2024.

Notice of allowance in U.S. Appl. No. 18/086,103, dated Apr. 3, 2024.

Office Action in U.S. Appl. No. 17/504,260, dated Mar. 21, 2024.

Office Action in U.S. Appl. No. 17/504,299, dated Mar. 22, 2024.

Office Action in U.S. Appl. No. 18/195,152, dated Mar. 26, 2024.

International Search Report and Written Opinion of the International Searching Authority issued in International Application No. PCT/US2023/036567, mailed Mar. 11, 2024 (18 pages).

International Search Report and Written Opinion of the International Searching Authority issued in International Application No. PCT/US2023/081101, mailed Mar. 11, 2024 (19 pages).

Bluetooth Special Interest Group: "Bluetooth Human Interface Device (HID) Profile Specifications", Bluetooth Adopted Specification Web page, Feb. 21, 2012 (Feb. 21, 2012), pp. 1-123, XP055133797, Retrieved from the Internet: URL:https://www.bluetooth.org/en-us/specification/adopted-specifications [retrieved on Aug. 7, 2014].

Office Action in U.S. Appl. No. 17/856,895, dated Mar. 12, 2024.

International Search Report and Written Opinion of the International Searching Authority issued in International Application No. PCT/US2023/036609, mailed Feb. 12, 2024 (15 pages).

International Search Report and Written Opinion of the International Searching Authority issued in International Application No. PCT/US2023/079518, mailed Feb. 9, 2024 (12 pages).

Notice of allowance in U.S. Appl. No. 17/504,283, dated May 29, 2024.

Notice of allowance in U.S. Appl. No. 17/504,299, dated Jun. 12, 2024.

Notice of allowance in U.S. Appl. No. 17/856,895, dated Jun. 12, 2024.

Notice of allowance in U.S. Appl. No. 18/076,146, dated Jun. 13, 2024.

Notice of allowance in U.S. Appl. No. 18/086,103, dated May 28, 2024.

International Search Report and Written Opinion of the International Searching Authority issued in International Application No. PCT/US2023/079521, mailed May 24, 2024 (15 pages).

U.S. Appl. No. 18/746,611, filed Jun. 2024, Ivan Torres.

U.S. Appl. No. 18/739,527, filed Jun. 2024, Hong Tai Wei.

Notice of allowance in U.S. Appl. No. 18/076,146, dated Jul. 22, 2024.

Notice of allowance in U.S. Appl. No. 18/086,103, dated Jul. 9, 2024.

Notice of allowance in U.S. Appl. No. 18/195,152, dated Jul. 23, 2024.

Notice of allowance in U.S. Appl. No. 18/224,508, dated Jun. 21, 2024.

Notice of allowance in U.S. Appl. No. 17/856,895, dated Apr. 16, 2024.

Office Action in U.S. Appl. No. 18/405,077, dated May 7, 2024.

International Search Report and Written Opinion of the International Searching Authority issued in International Application No. PCT/US2024/010404, mailed Apr. 24, 2024 (16 pages).

Office Action in U.S. Appl. No. 17/504,260, dated Jul. 23, 2024.

(56) References Cited

OTHER PUBLICATIONS

International Search Report and Written Opinion of the International Searching Authority issued in International Application No. PCT/US2024/019901, mailed Jul. 17, 2024 (15 pages).
Anonymous: "Using the wireless controller", Playstation 4 User's Guide, Mar. 15, 2023 (Mar. 15, 2023), pp. 1-3, XP093178521, Retrieved from the Internet: URL:https://web.archive.org/web/20230315012624/https://manuals.playstation.net/document/en/ps4/basic/usercontroller.html [retrieved on Jun. 5, 2024] the whole document, 3 pages.
U.S. Appl. No. 18/734,411, filed Jun. 2024, Maker.
U.S. Appl. No. 18/777,919, filed Jul. 2024, Khaira et al.
U.S. Appl. No. 18/805,902, filed Aug. 2024, Khaira et al.
Notice of allowance in U.S. Appl. No. 17/504,283, dated Sep. 10, 2024.
Notice of allowance in U.S. Appl. No. 17/504,299, dated Sep. 10, 2024.
Notice of allowance in U.S. Appl. No. 17/856,895, dated Aug. 28, 2024.
Notice of allowance in U.S. Appl. No. 18/195,152, dated Aug. 30, 2024.
Notice of allowance in U.S. Appl. No. 18/224,508, dated Aug. 29, 2024.
Office Action in U.S. Appl. No. 18/405,077, dated Sep. 11, 2024.
Retro Game Corps, "This Controller Could Change Mobile Gaming" (youtube.com), Oct. 3, 2024, obtained from the Internet on Oct. 10, 2024; URL: https://www.youtube.com/watch?v=J3969hkkFSE, 21 pages.
GameSir G8 Plus Bluetooth Mobile Controller—Big Enough as You Want—GameSir Official Store, obtained from the Internet on Oct. 10, 2024; URL: https://www.gamesir.hk/blogs/news/gamesir-g8-plus-bluetooth-mobile-controller-big-enough-as-you-want, 8 pages.
Kyle Bradshaw, GameSir G8 Galileo Review: The mobile controller I've dreamed of (9to5google.com), obtained from the Internet on Oct. 10, 2024; URL: https://9to5google.com/2024/01/25/review-gamesir-g8-galileo-android-ios/, 12 pages.
Nintendo Switch—Nintendo—Official Site, obtained from the Internet on Oct. 10, 2024; URL: https://www.nintendo.com/us/switch/system/, 17 pages.
Nintendo switch internal—Search Images (bing.com), obtained from the Internet on Oct. 10, 2024; URL: https://www.bing.com/images/search?view=detailV2&ccid=87gF12WI&id=31A64F955C01D87035FBF76FC2B1082808CDF4C2&thid=OIP.87gF12WIjRYTL2hDhEBZtQAAAA&mediaurl=https%3a%2f%2fwww.allaboutcircuits.com%2fuploads%2farticles%2fMouser_IA_Switch_figure5.jpg&cdnurl=https%3a%2f%2fth.bing.com%2fth%2fid%2fR.f3b805d765888d16132f6843844059b5%3frik%3dwvTNCCglscJv9w%26pid%3dImgRaw%26r%3d0&exph=355&expw=474&q=ninetnedo+switch+internal&simid=608038160133663134&FORM=IRPRST&ck=C6F7BED9A8A0BA549A06B2B38B157AFA&selectedIndex=1&itb=0&ajaxhist=0&ajaxserp=0, 4 pages.
Office Action, Advisory Action, in U.S. Appl. No. 17/504,260, dated Nov. 14, 2024.
Walmart.com; search, obtained from the Internet on Nov. 17, 2024; URL: https://www.walmart.com/search?q=for+Apple+MagSafe+Charger%2C+Wireless+Charger+with+Fast+Charging+Capability%2C+Type+C+Wall+Charger%2C+Compatible+for+iPhone+and+AirPods; 3 pages.
M-Con; obtained from the Internet on Nov. 17, 2024; URL: https://www.m-con.co/; 6 pages.

\* cited by examiner

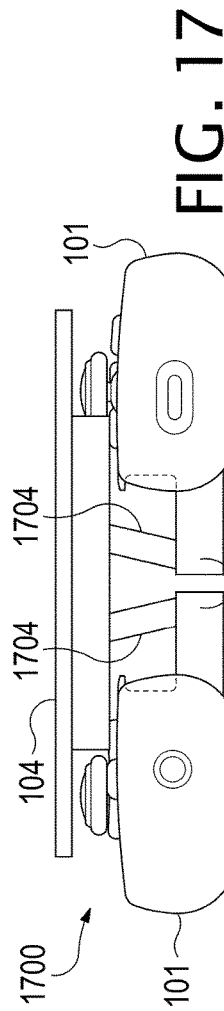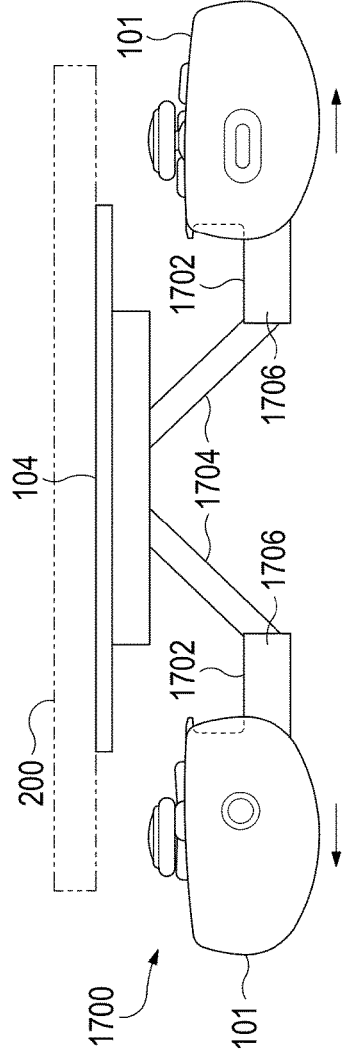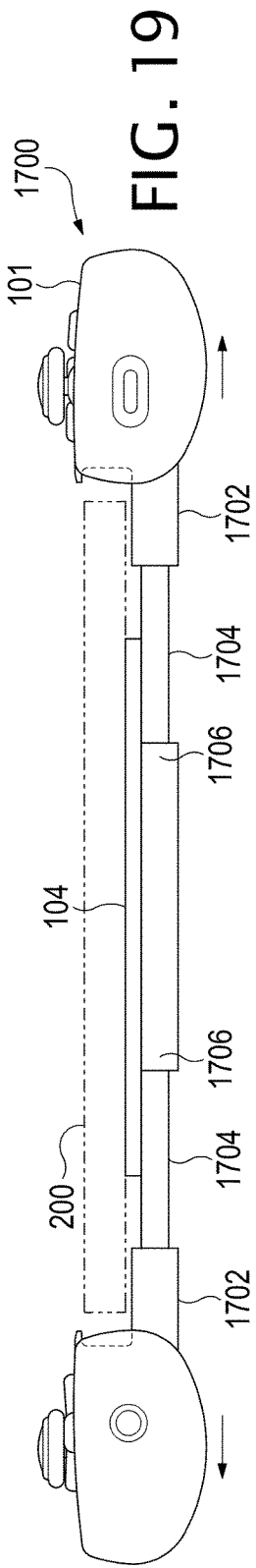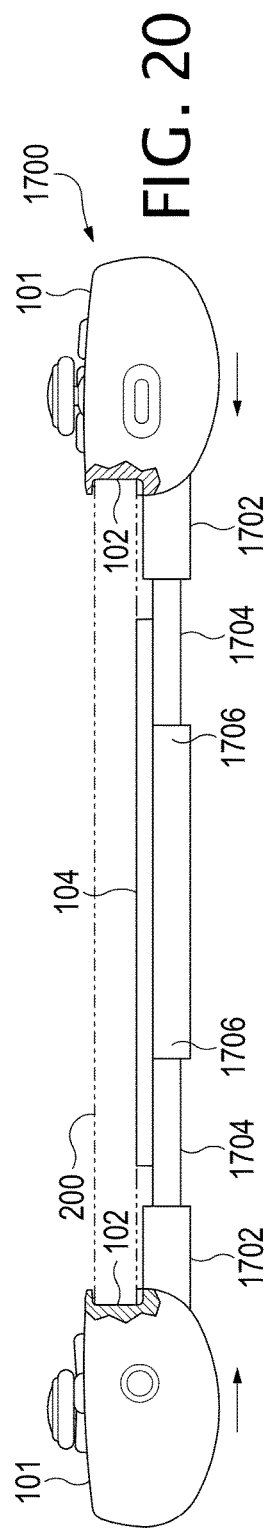

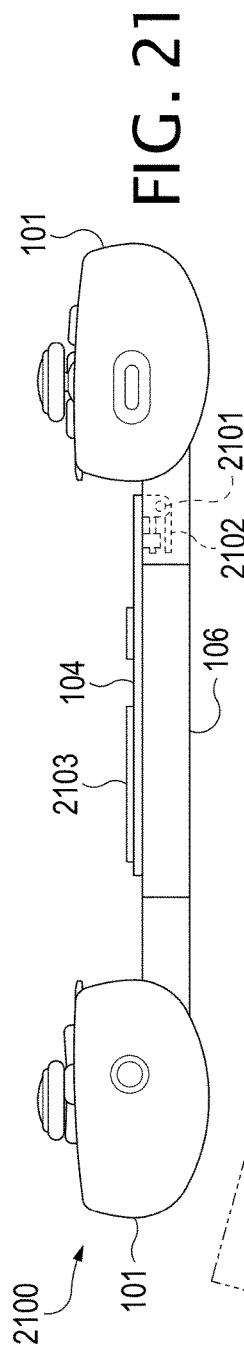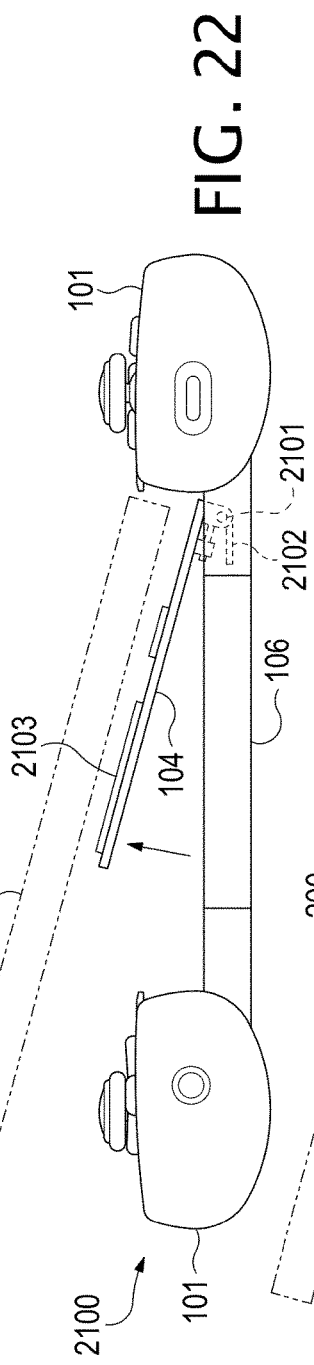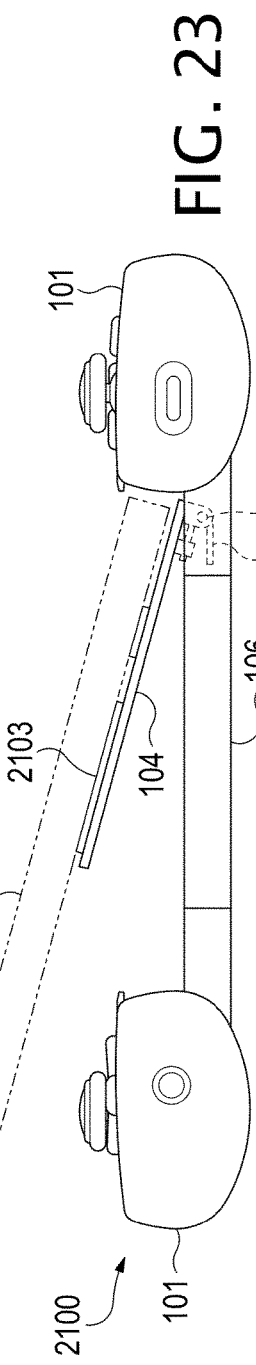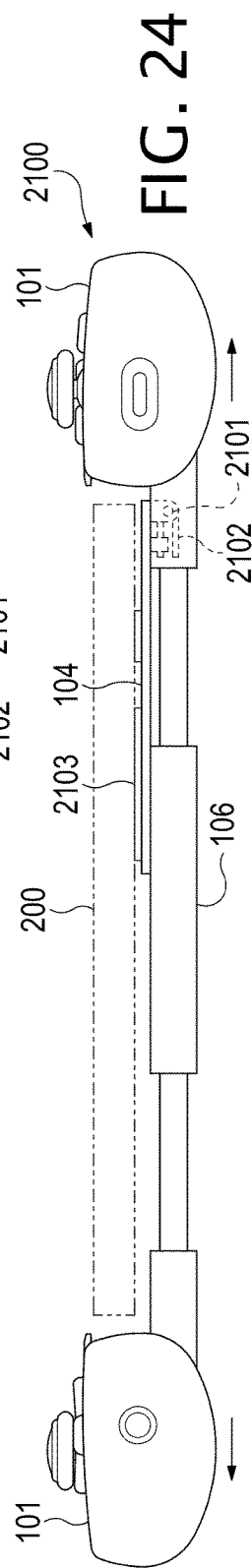

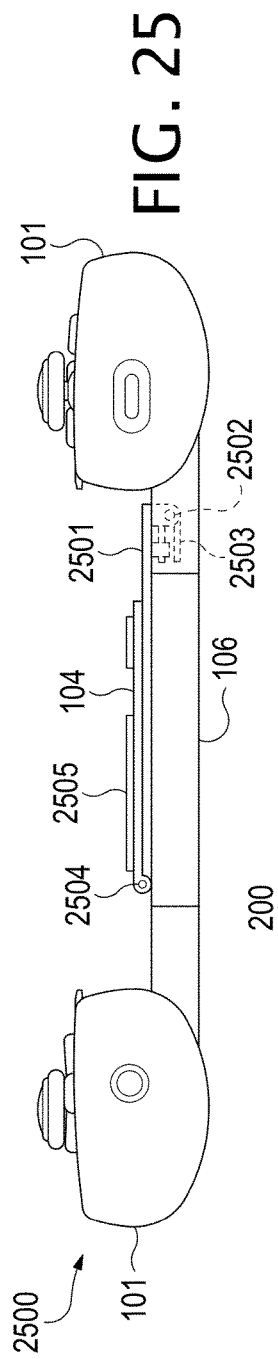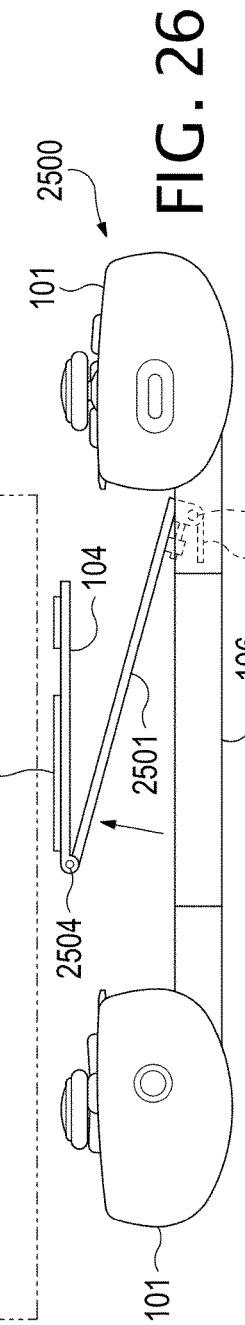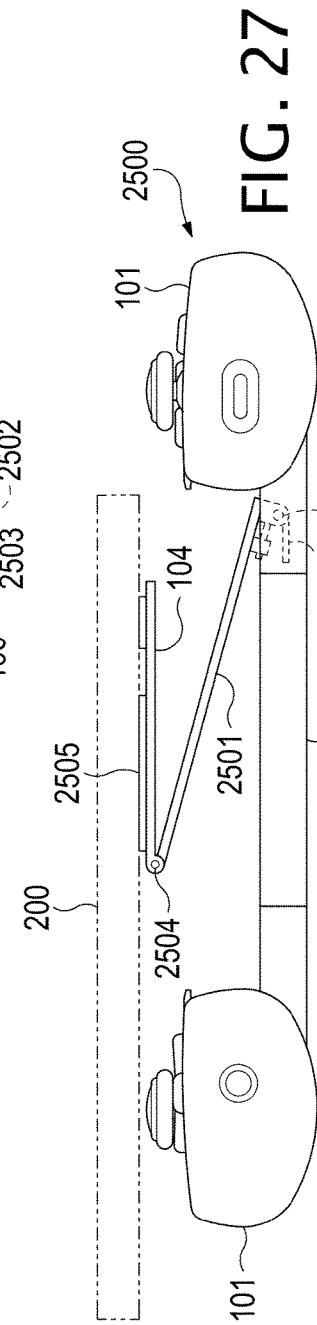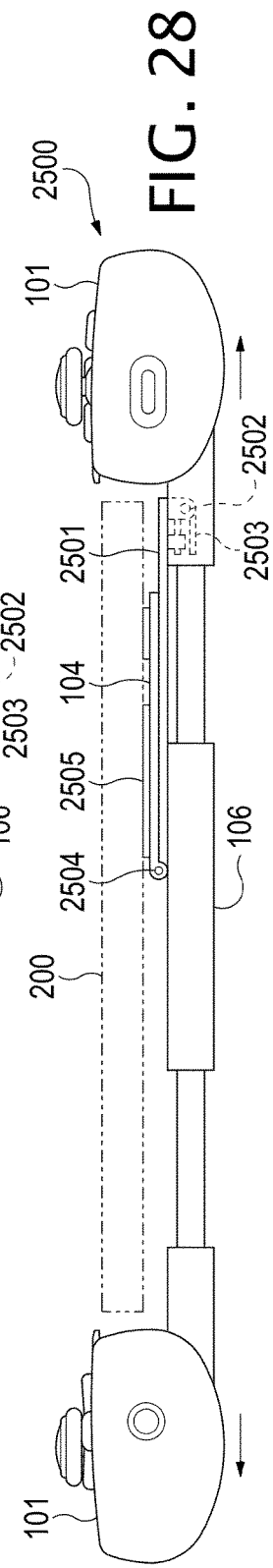

OPEN AND CLOSE FEATURES FOR GAME CONTROLLER BRIDGE

CROSS-REFERENCE TO RELATED APPLICATION

This application claims priority to U.S. Provisional Patent Application No. 63/437,580, filed Jan. 6, 2023, which is hereby incorporated by reference.

TECHNICAL FIELD

The subject matter is related to an apparatus and methods for opening and closing a gaming device, and, more particularly, to a system and methods for securing and releasing a mobile device that interfaces with the gaming device.

BACKGROUND

The gaming world has recently seen handheld devices entering the market that interface with mobile devices, simulating the traditional console experience while playing on a mobile device. These handheld devices typically consist of two handles—mimicking the grip, button, and joystick configurations of traditional console controllers—and some mode of connecting the handles through a mobile device's primary input port (e.g., lightning, USB-C, etc.). When the device is connected, a user can either run games locally on their mobile device or participate in cloud gaming and utilize the console-like controller for providing input, as opposed to the phone's own touchscreen or buttons.

The current devices on the market connect and secure the phone's position within the device using a force-open technique. A user pulls the handles laterally away from each other in opposition to a spring force or other force tending to pull the handles inward, then the user inserts the phone and release the handles to secure themselves around the phone through the inward lateral force. These force-open mechanisms can lead to awkwardness and difficulty inserting the mobile device into the device, as a user must both force the handles outward and maneuver the phone into the proper place at the same time. The awkwardness and difficulty may be aggravated depending on a phone's size or the dimensions of a protective case the user may be using. The same awkwardness and difficulty may be present when removing the phone as well. Not only do such difficulties affect the user's experience, they also create a risk of dropping and damaging either the phone or the gaming device.

Configurations of the disclosed technology address shortcomings in the prior art.

BRIEF DESCRIPTION OF THE DRAWINGS

FIG. 17 is a bottom view of a handheld gaming device having a magnetic platform and arm mechanism for receiving and securing a mobile device, according to a fifth example configuration.

FIG. 18 is a bottom view of the handheld gaming device of FIG. 17 in which the gaming device is opened to receive the mobile device.

FIG. 19 is a bottom view of the handheld gaming device of FIG. 17 in which the platform is lowered.

FIG. 20 is a bottom view of the handheld gaming device of FIG. 17 in which the mobile device is secured within the gaming device.

FIG. 21 is a bottom view of a handheld gaming device having a platform pivotally connected to a handle of the gaming device, according to a sixth example configuration.

FIG. 22 is a bottom view of the handheld gaming device of FIG. 21, illustrating an example mobile device being positioned for attachment to the platform, while the bridge of the handheld gaming device is in the closed position.

FIG. 23 is a bottom view of the handheld gaming device of FIG. 21, illustrating the example mobile device coupled to the platform, while the bridge of the handheld gaming device is in the closed position.

FIG. 24 is a bottom view of the handheld gaming device of FIG. 21, illustrating the example mobile device coupled to the platform, while the bridge of the handheld gaming device is in the open position.

FIG. 25 is a bottom view of a handheld gaming device having a platform pivotally connected to a handle of the gaming device through an additional link, according to a seventh example configuration.

FIG. 26 is a bottom view of the handheld gaming device of FIG. 25, illustrating an example mobile device being positioned for attachment to the platform, while the bridge of the handheld gaming device is in the closed position.

FIG. 27 is a bottom view of the handheld gaming device of FIG. 25, illustrating the example mobile device coupled to the platform, while the bridge of the handheld gaming device is in the closed position.

FIG. 28 is a bottom view of the handheld gaming device of FIG. 25, illustrating the example mobile device coupled to the platform, while the bridge of the handheld gaming device is in the open position.

DETAILED DESCRIPTION

As described herein, aspects are directed to apparatus and methods for securing and releasing a mobile device to and from a gaming device that interfaces with the mobile device. Configurations of the disclosed technology improve the user experience of inserting and removing a mobile device from the gaming device and reduces the risk of damage to both the mobile device and the gaming device. Aspects are now described in more detail.

Figure 1:
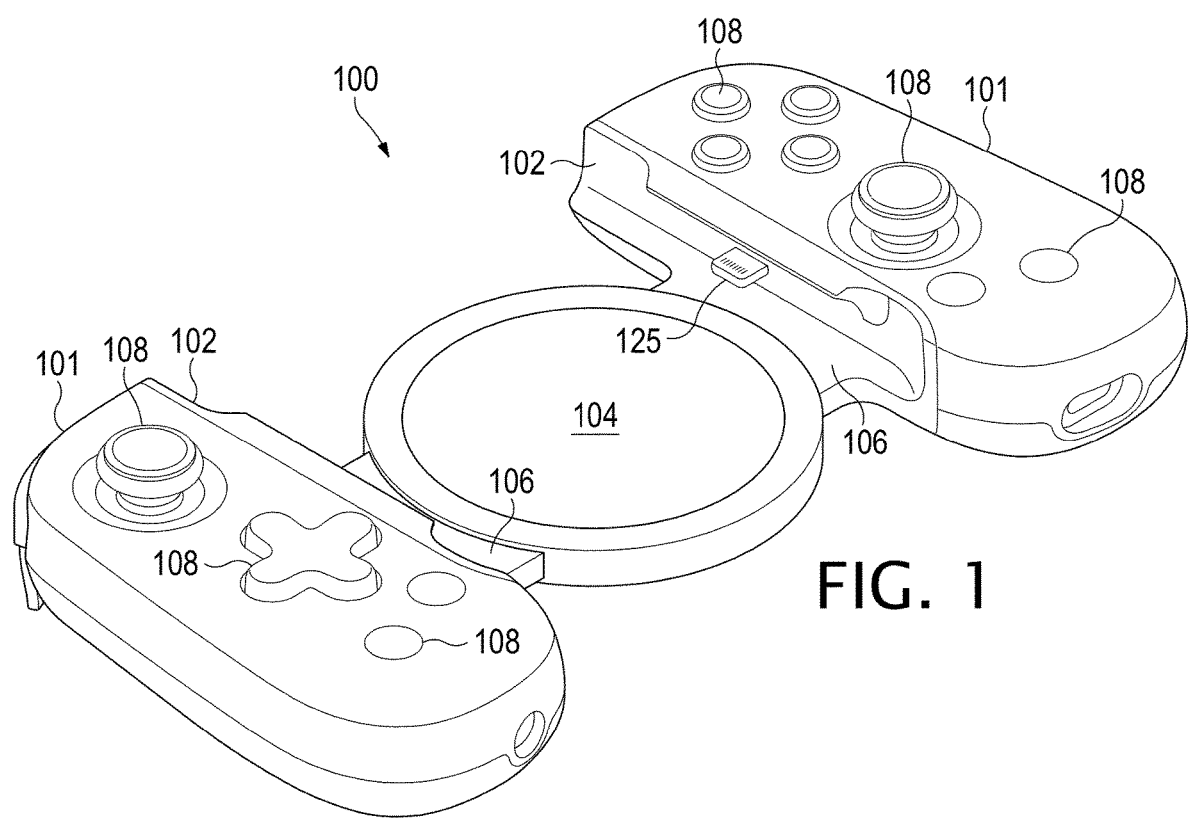
FIG. 1 is a perspective view of a handheld gaming device in a closed position.

FIG. 1 depicts a gaming device for interfacing with a mobile device, in a closed position before the mobile device is inserted. For purposes of the disclosure, "mobile device" refers to a portable, handheld computing device, such as a smartphone, tablet, or other comparable mobile device. As illustrated in FIG. 1, a gaming device 100 includes handles 101, which may have compliant inner linings 102, in configurations, to assist in securing the mobile device 200 in place for gameplay. Even so, not all configurations include compliant inner linings 102. In configurations, the device 100 may also include a platform 104 structured to receive the mobile device 200. The platform 104 is mounted to a bridge 106, which connects the handles 101 and may be extended and retracted for inserting, securing, and removing the mobile device 200. In configurations, the gaming device 100 may include a connector 125 structured to physically and electronically interface with the mobile device 200. In other configurations, the interface is wireless. Each handle 101 in the illustrated configuration includes user-accessible, hardware interfaces 108, such as one or more of a button, an analog stick, a touchscreen, a touchpad, a knob, a slider, a switch, a wheel, a dial, a directional pad, or another such feature configured to accept touch inputs from a user's finger or a stylus.

Figure 2:
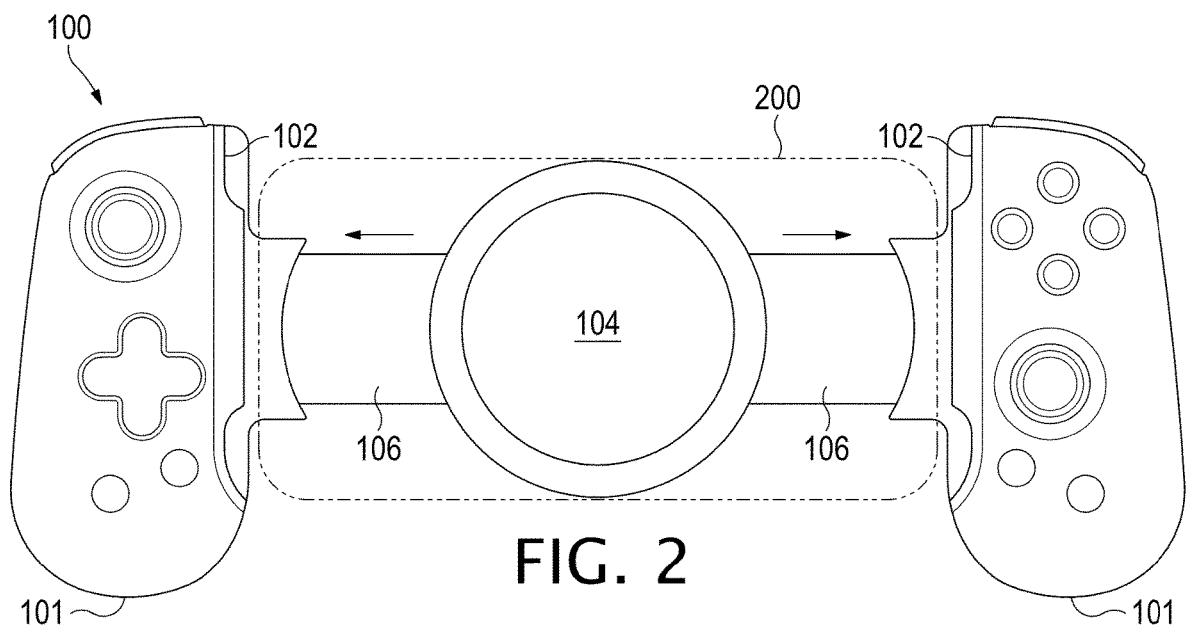
FIG. 2 is a front view of the handheld gaming device of FIG. 1 in an example open position for reception of a mobile device.

FIG. 2 depicts the gaming device in an open position, where the handles 101 have been moved far enough apart (as indicated by the arrows in FIG. 2) so that a mobile device 200 may be inserted to interface with the gaming device 100. As described in greater detail below, the gaming device 100 may open to this position via one of several mechanisms.

Once the gaming device 100 has reached its open position, a user may begin inserting a mobile device 200 by engaging the mobile device 200 with the platform 104. In configurations, the platform 104 may be magnetic to attract the mobile device 200 to the platform 104. Accordingly, the platform 104 may provide an initial level of stability for the mobile device 200 on the bridge 106 before the handles 101 are closed.

Figure 3:
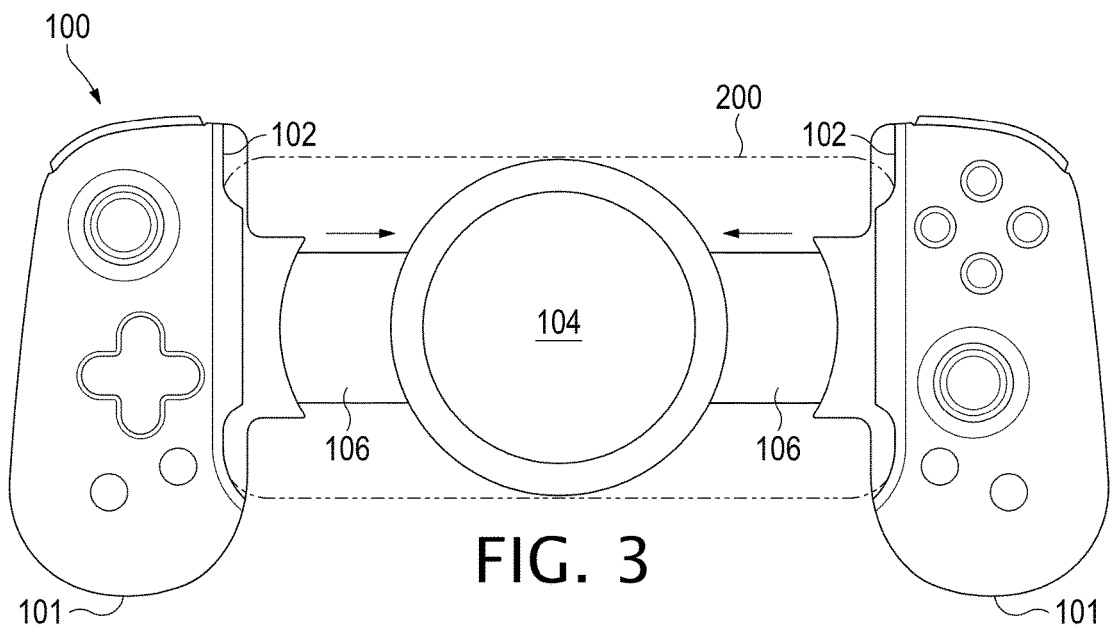
FIG. 3 is a front view of the handheld gaming device of FIG. 1 and a mobile device secured within the mobile device for gameplay.

FIG. 3 depicts the gaming device 100 and mobile device 200 in a position for gameplay, where the mobile device 200 is secured and connected to the gaming device 100. As depicted, the handles 101 are brought laterally inward (as indicated by the arrows in FIG. 3) once the mobile device 200 has been received by the platform 104. In some configurations, when the handles 101 reach the edges of the mobile device 200, compliant linings 102 may cushion and grip the edges of the mobile device 200, providing stability and protection in the device's secured gameplay position. When gameplay is concluded, the mobile device 200 may be released and removed from the gaming device 100, and the gaming device 100 may return to a closed state, such as depicted in FIG. 1.

The configurations illustrated in FIGS. 4-20 are generally like the configuration illustrated in FIGS. 1-3 except as noted below.

Figure 4:
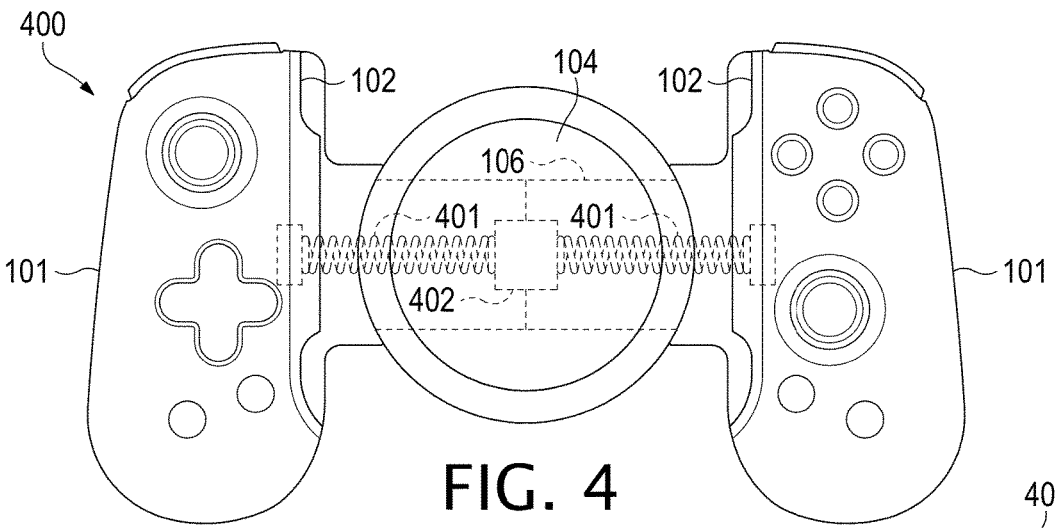
FIG. 4 is a front view of the handheld gaming device having a spring mechanism for extending the handheld gaming device to an open position, according to a first example configuration.
Figure 5:
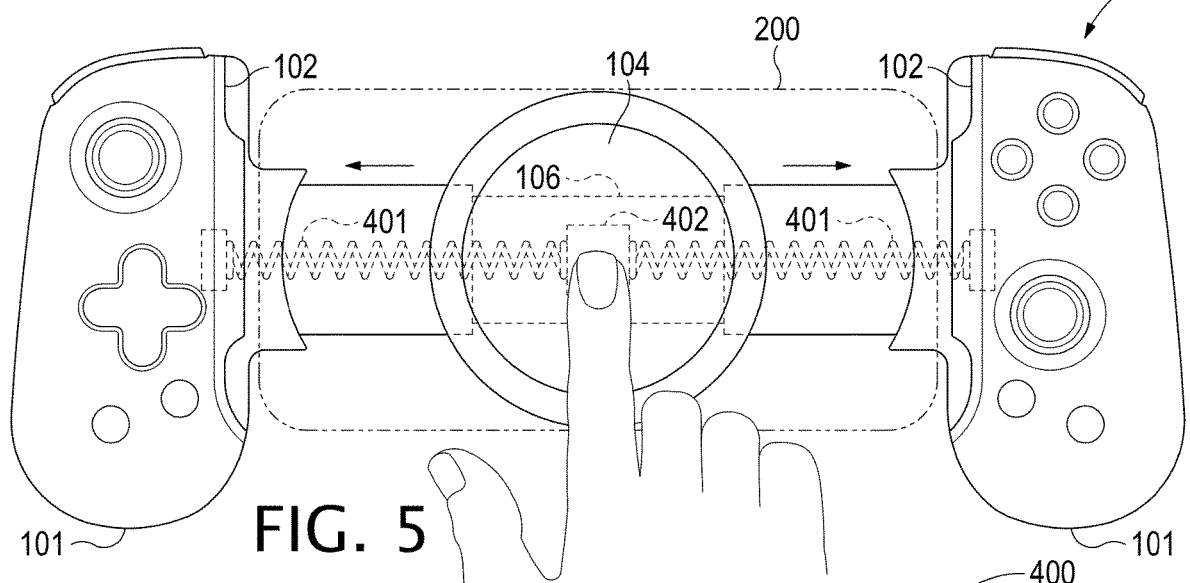
FIG. 5 is a front view of the handheld gaming device of FIG. 4 where the spring mechanism has been triggered to open the handheld gaming device.
Figure 6:
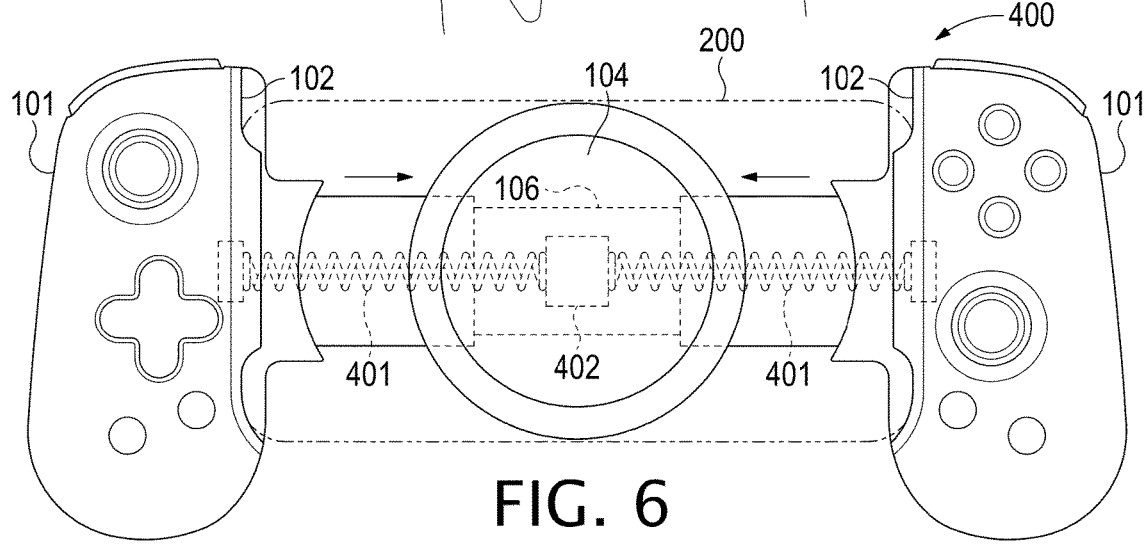
FIG. 6 is a front view of the handheld gaming device of FIG. 4 where the mobile device is secured within the mobile device.

FIGS. 4-6 illustrate the details of a mechanism for setting a gaming device 400 in its open position, according to a first example configuration. In this example configuration, one or more springs 401 located within the bridge 106 is in a compressed state when the device is in its closed position, such as in FIG. 4. The user may initiate a release of the springs 401 via mechanical, electrical, magnetic, or other suitable trigger means 402. For example, the user may press a button on the device that is mechanically structured to release the springs 401 from their compressed state within the bridge 106 or to otherwise unlock the bridge 106, allowing the bridge 106 to extend from the closed position. The release of the springs 401 or unlocking of the bridge 106 could also be accomplished by an electrically operated release or a magnetically operated release. When the springs 401 are released, the springs 401 extend and cause the bridge 106 to extend (as indicated by the arrows in FIG. 5). In this example configuration, the extension of the springs 401 does not move the platform 104; rather, the platform 104 maintains a position substantially in the center of the handles 101 to assist in receiving the mobile device 200. Once the mobile device 200 has been inserted, the handles 101 may be moved laterally inward (as indicated by the arrows in FIG. 6), such as via a rack mechanism in an example configuration. In this example configuration, the handles 101 move inward at set indices until reaching the edges of the mobile device 200. Once the handles 101 reach the edges of the mobile device, the handles 101 may move inward one final index, compressing the compliant linings 102 to secure the mobile device 200. In configurations, the compliant linings 102 are structured to be thicker in width than the distance of a single index in the rack mechanism. As such, the compliant linings 102 may cushion the edges of the mobile device 200 while ensuring that the mobile device 200 is snugly secured between the handles 101, accounting for discrepancies between the mobile device's dimensions and the widths of the rack indices. Even so, not all versions include the compliant linings 102.

In alternative configurations, instead of or in addition to the springs 401, the gaming device 400 may utilize compressed air or hydraulics to extend the bridge 106 from the closed position to the open position.

Figure 7:
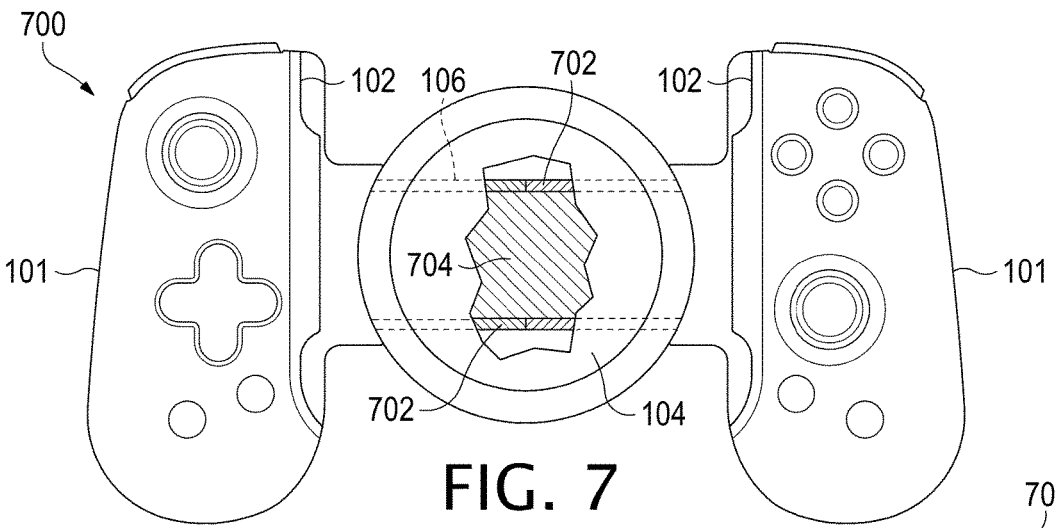
FIG. 7 is a front view of a handheld gaming device having a slidable, friction system for extending and retracting the handheld gaming device around a mobile device for gameplay, according to a second example configuration.
Figure 8:
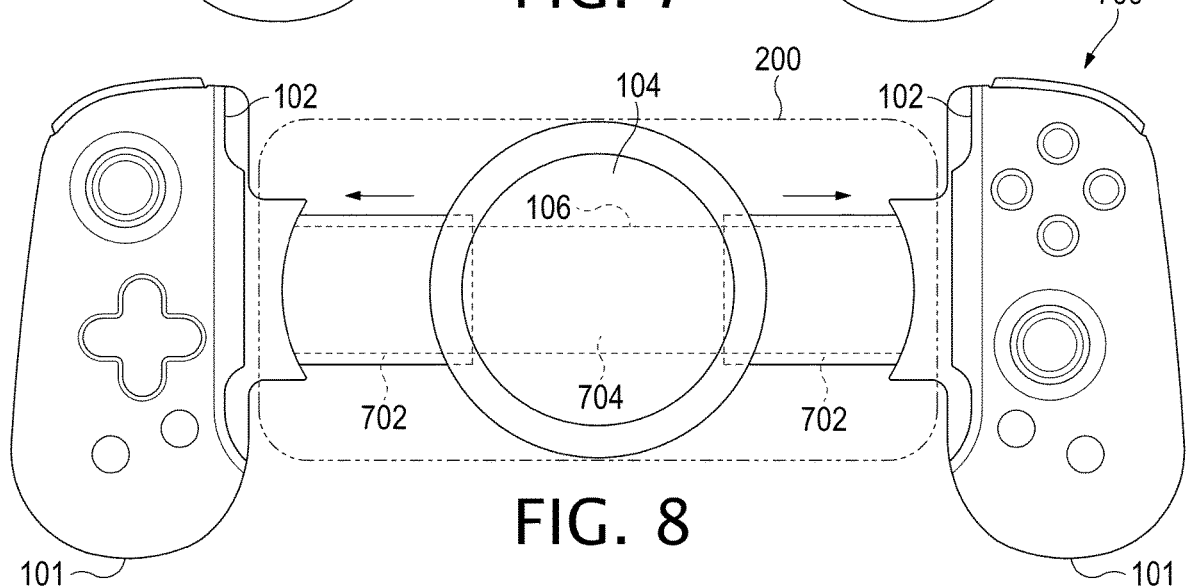
FIG. 8 is a front view of the handheld gaming device of FIG. 7, showing the gaming device open for reception of the mobile device.
Figure 9:
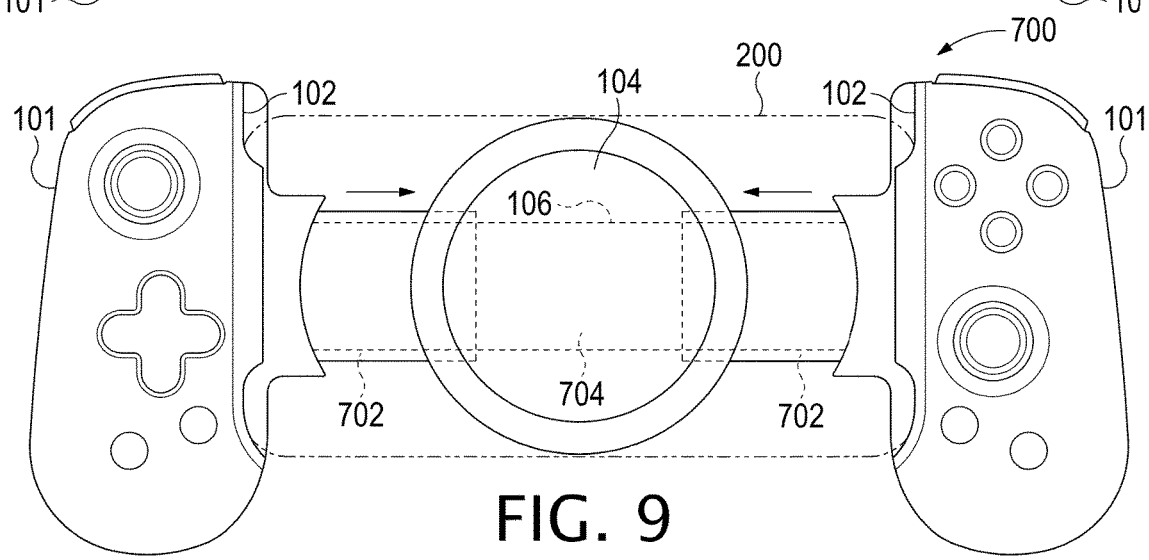
FIG. 9 is a front view of the handheld gaming device of FIG. 7, showing the mobile device secured within the gaming device.

FIGS. 7-9 illustrate the details of another mechanism for setting a gaming device 700 in its open position, according to a second example configuration. In such configurations, portions of the bridge 106, such as surfaces 702 and 704, slide against each other during movement of the bridge 106 between the extended position to the retracted position. The friction of the sliding of the surfaces 702 and 704 resists lateral movement of the handles either inward or outward. Accordingly, the handles 101 may be pulled away from each other (as shown by the arrows in FIG. 8) or pushed toward each other (as shown by the arrows in FIG. 9) in response to a force, but the handles 101 remain stationary when no force is applied. As described, movement of the handles 101 to extend or retract the bridge 106 does not move the platform 104.

Figure 29:
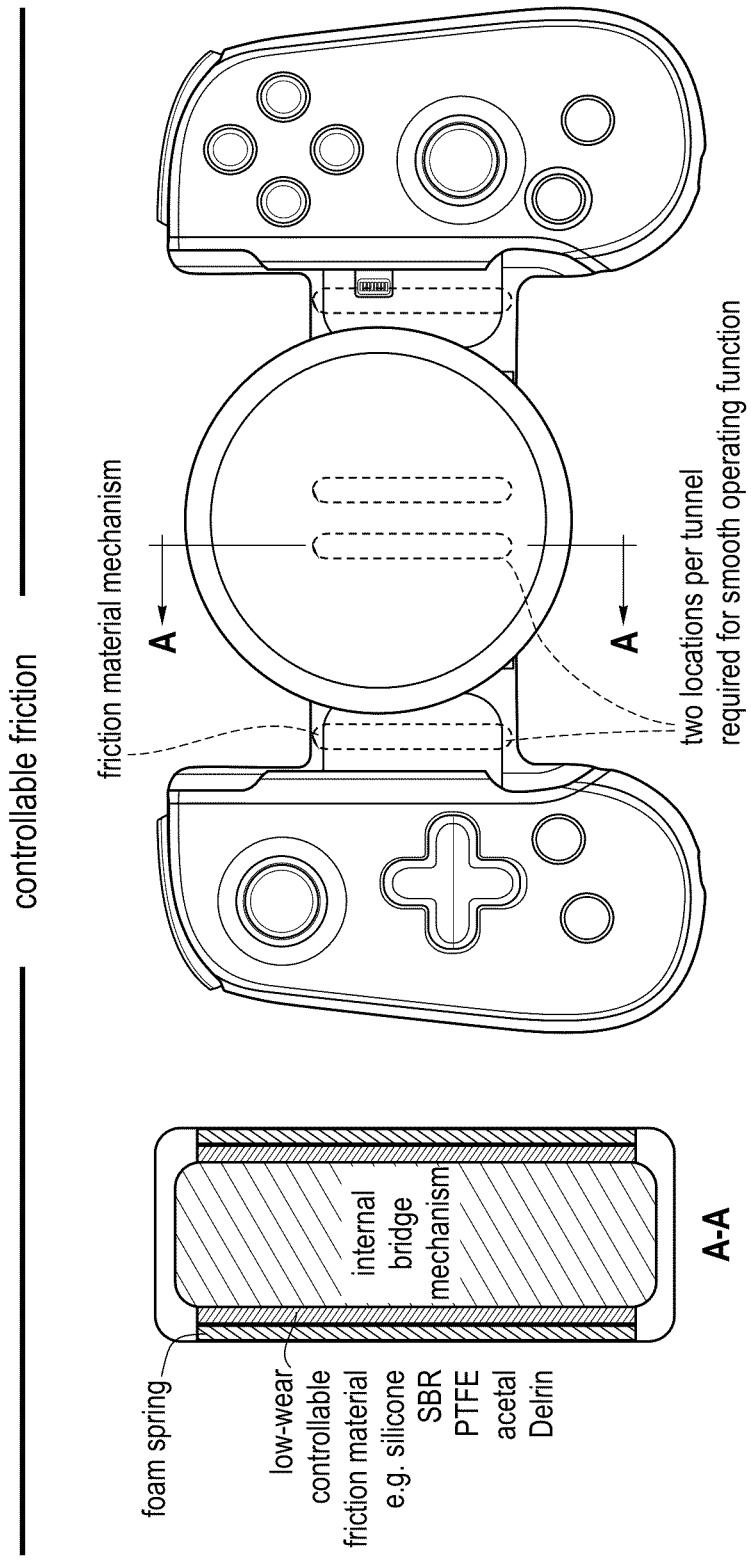
FIG. 29 is a front view and a cross-sectional view of a handheld gaming device having example controllable friction surfaces to resist movement of the bridge, according to an example configuration.

In configurations, the sliding mechanism may include friction surfaces, a rack mechanism, or other suitable methods of resisting and forcing lateral movement. FIG. 29 shows an example of a configuration having controllable friction surfaces. As illustrated in FIG. 29, the gaming device may include one or more sections where a springy material, such as a foam spring, biases a controllable friction material toward the bridge 106 or between sections of the bridge 106. For example, as illustrated in FIGS. 7-9, the bridge 106 may slide within one or both of the handle guide portions (identified as "tunnel" in FIG. 29) during movement of the bridge 106 between the extended position and the retracted position. In such configurations, the controllable friction material may be located between the bridge 106 and one or both of the handle guide portions. The handle guide portion extends from the main body portion of the handle. As illustrated in FIG. 29, in configurations there is more than one section of controllable friction material. The controllable friction material may be, as examples, silicone, styrene-butadiene rubber (SBR), polytetrafluoroethylene (PTFE), acetal, or synthetic resinous plastic material, such as the plastic material provided under the DELRIN® brand owned by Dupont Polymers, Inc.

Figure 30:
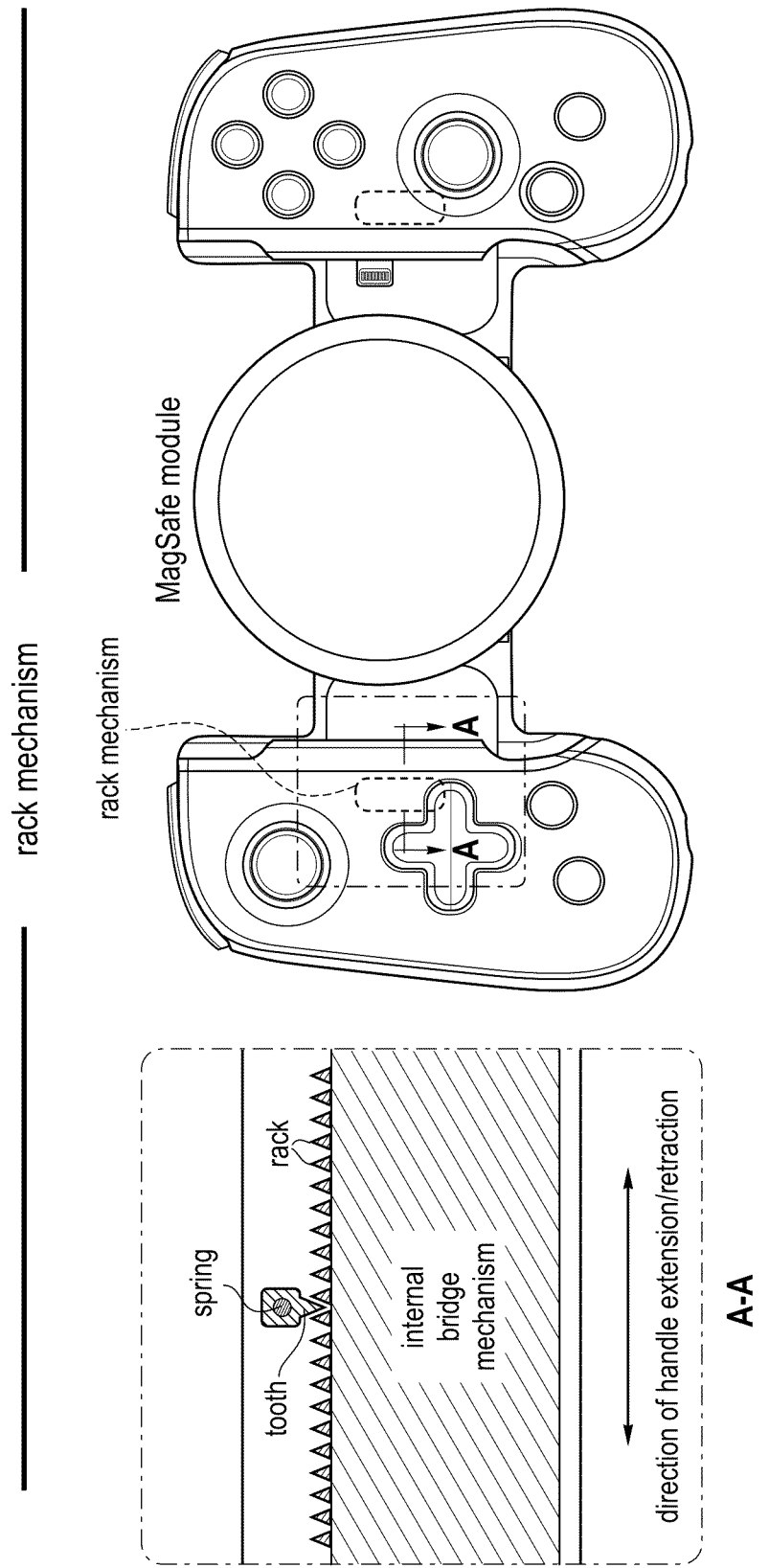
FIG. 30 is a front view and a detail, cutaway view of a handheld gaming device having an example rack mechanism to resist movement of the bridge, according to an example configuration.

FIG. 30 shows an example of a rack mechanism to resist movement of the bridge 106 between the extended position and the retracted position (including vice versa). As illustrated in FIG. 30, the bridge 106 may include a rack that engages a spring-mounted tooth. Hence when the bridge 106 is either extended or retracted, the spring-mounted tooth provides resistance to movement of the bridge 106 by engaging the rack.

Figure 31:
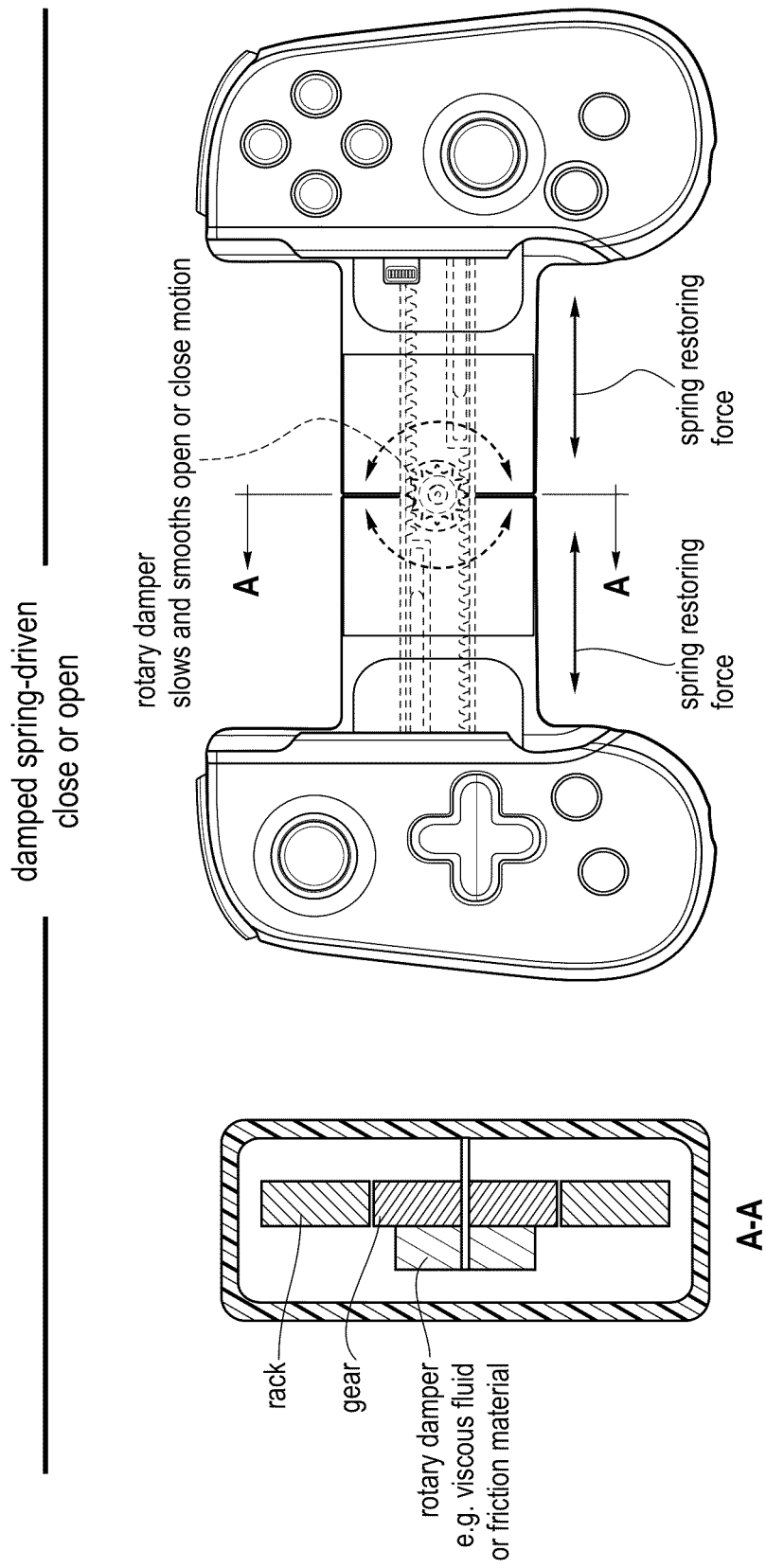
FIG. 31 is a front view and a cross-sectional view of a handheld gaming device having an example damping mechanism to resist movement of the bridge, according to an example configuration.

Configurations of the sliding mechanism may also include a damper to smooth the lateral movement and improve the user experience. FIG. 31 shows an example of a game controller having a rotary damper. As illustrated in FIG. 31, a gear may engage with a rack coupled to the bridge 106, causing the gear to rotate as the bridge 106 extends and retracts. The gear, in turn, may be coupled to a rotary damper to resist rotation of the gear. The rotary damper may include, for example, a viscous fluid or friction material to oppose rotation of the gear.

Figure 10:
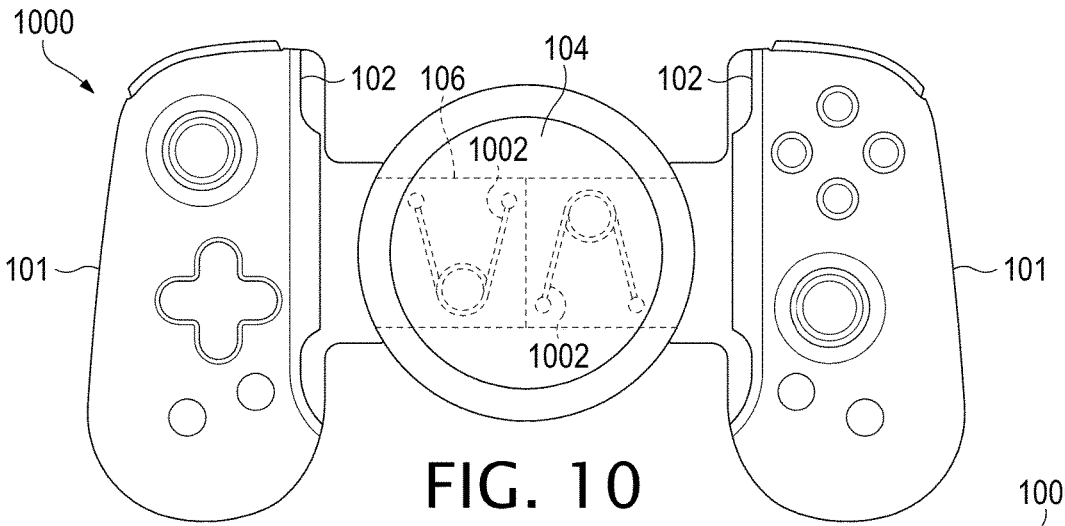
FIG. 10 is a front view of a handheld gaming device having a spring mechanism with multiple stable states for extending and retracting the handheld gaming device, according to a third example configuration.
Figure 11:
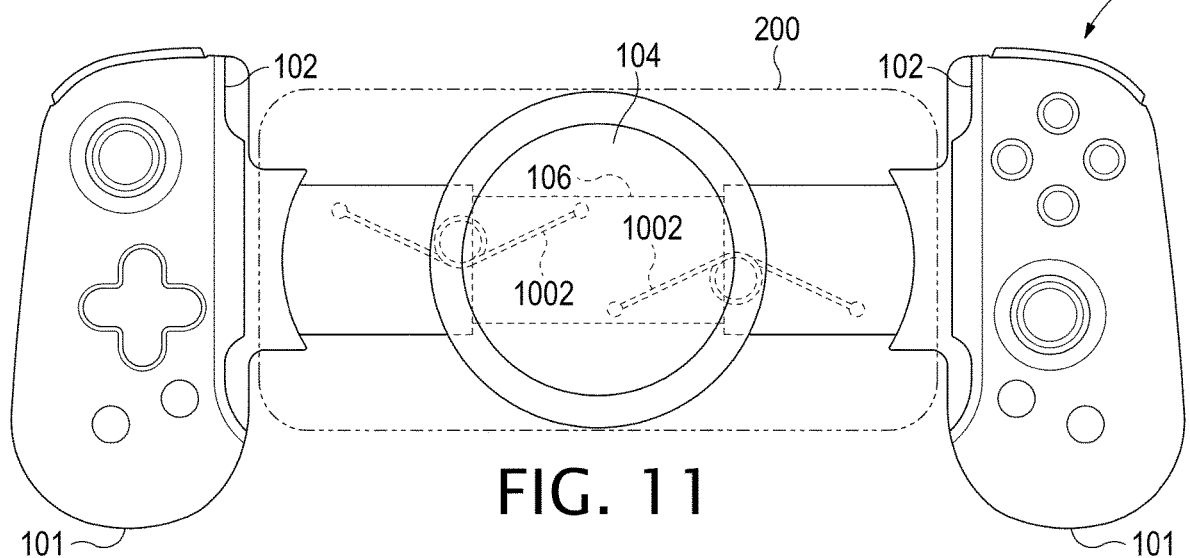
FIG. 11 is a front view of the handheld gaming device of FIG. 10 in which a second stable state is accessed to open the gaming device for reception of the mobile device.
Figure 12:
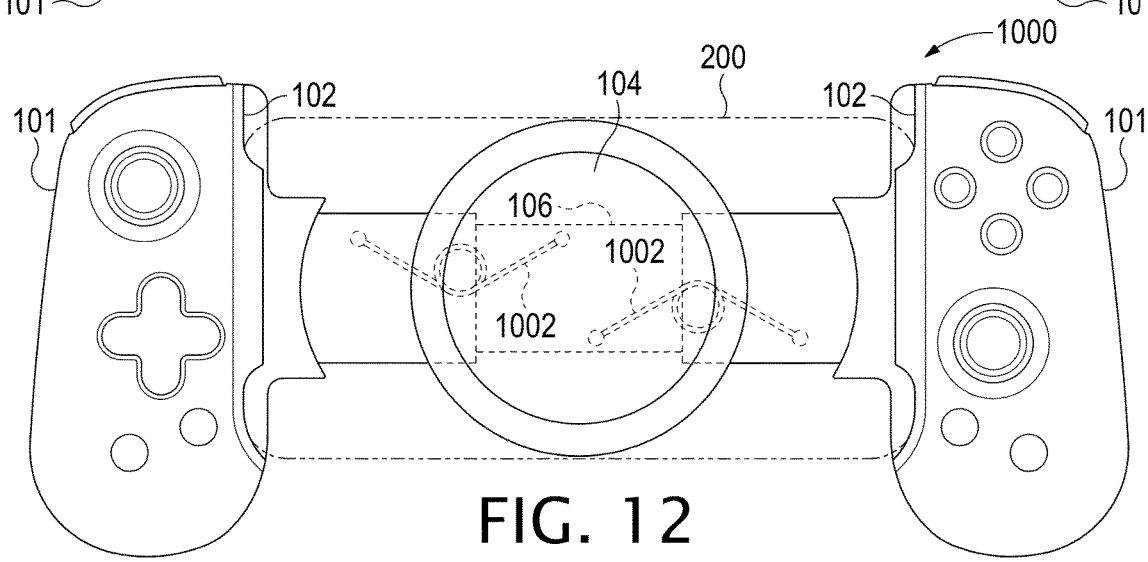
FIG. 12 is a front view of the handheld gaming device of FIG. 10, showing the mobile device secured within the gaming device.
Figure 13:
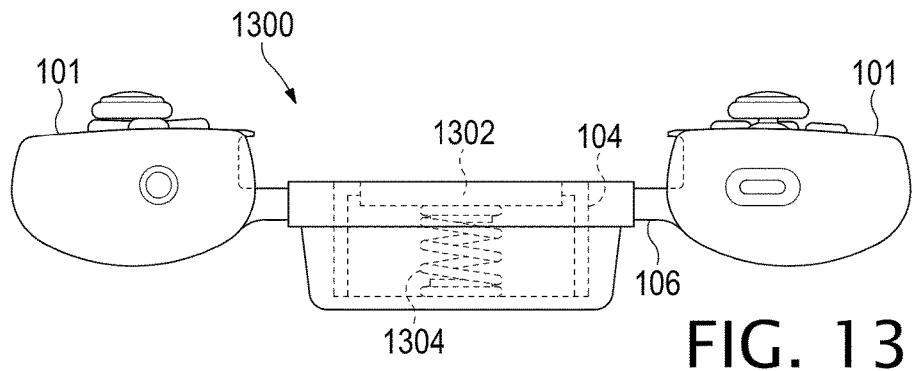
FIG. 13 is a bottom view of a handheld gaming device having a magnetic platform mechanism for receiving and securing a mobile device, according to a fourth example configuration.
Figure 14:
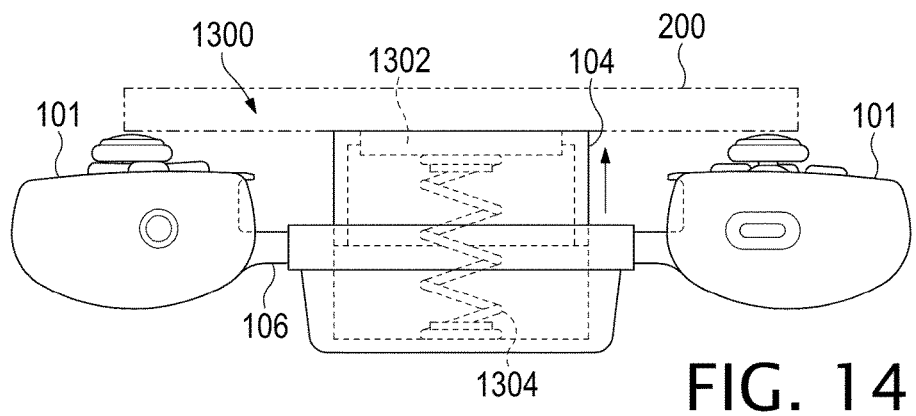
FIG. 14 is a bottom view of the handheld gaming device of FIG. 13, showing the mechanism the magnetic platform as being magnetically connected to the mobile device.

FIGS. 10-12 illustrate the details of another mechanism for setting a gaming device 1000 in its open position, according to a third example configuration. In this configuration, a spring mechanism 1002 within the bridge 106 includes two states. In the spring mechanism's first state, one or more springs within the bridge 106 tend to force the bridge 106 into a closed position when no outside force is acting on the gaming device 1000; hence the gaming device 1000 remains in a closed position. A user may then pull the handles 101 laterally away from each other to a set distance, extending the springs and triggering the spring mechanism 1002 to enter its second state. In the second state, rather than biasing the bridge 106 in the closed position, the spring mechanism 1002 biases the bridge 106 in the open position to allow for reception of the mobile device 200. The set distance noted is less than the distance between the handles 101 that would be required to insert the mobile device 200 between the handles 101. That insertion distance is approximately what is shown in FIG. 11, where the mobile device 200 would just fit into the gaming device 1000. Preferably, the set distance is less than half of the insertion distance. More preferably, the set distance is less than one-quarter of the insertion distance. Accordingly, the user only has to separate the handles 106 a small amount, less than the full open distance, at which point the spring mechanism 1002 changes from the first state to the second state, rapidly pushing apart the handles 106 without user interaction. Once in the open state, the handles 106 stay biased apart. The spring mechanism 1002 may include one or more bi-stable springs.

Upon reception of the mobile device 200, the user may pull the handles 101 laterally away from each other once again, and the spring mechanism 1002 will exit its second stable state and revert to the first state, creating an inward force and securing the compliant linings 102 around the edges of the mobile device 200.

The same mechanism can be used in the reverse direction to make the gaming device 1000 more compact. In particular, the mobile device 200 can be removed from the gaming device 1000, and the user can begin to push the handles toward each other. At a particular distance between the handles, the spring mechanism 1002 changes from the second state to the first state, rapidly pushing the handles 106 together without user interaction.

FIGS. 13-16 detail a fourth configuration for a gaming device 1300, in which the platform 104 includes a magnet 1302. In this configuration, a user may bring their mobile device 200 near the platform 104, causing the platform 104 to move away from the remainder of the gaming device 1300 due to attraction of the magnet 1302 to the mobile device 200, such as to a magnetic plate beneath the rear face of the mobile device 200. The platform 104 may be secured to the gaming device 1300 via a spring 1304, in configurations.

Figure 15:
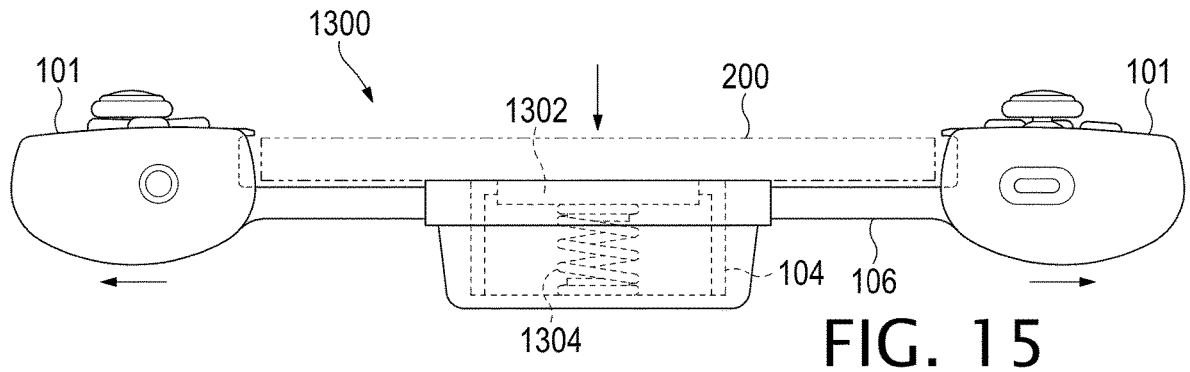
FIG. 15 is a bottom view of the handheld gaming device of FIG. 13 in which the platform is lowered.
Figure 16:
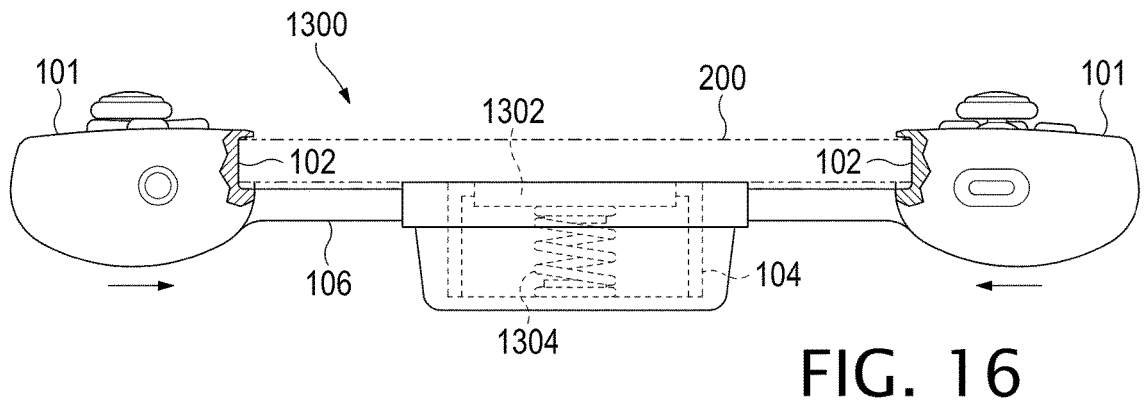
FIG. 16 is a bottom view of the handheld gaming device of FIG. 13 in which the mobile device is secured within the gaming device.

Once the platform 104 attaches to the rear face of the user's mobile device 200, the user may extend the handles 101 (see the arrows in FIG. 15), allowing the spring 1304 or other suitable means to pull the mobile device 200 toward the bridge 106. Once the mobile device 200 makes contact with the bridge 106 or the platform 104 is otherwise reseated on the bridge 106 (such as shown in FIG. 15), the user may retract the handles 101 (see the arrows in FIG. 16) to secure the mobile device 200 to the gaming device 1300. Accordingly, in such configurations, the magnetic force between the platform 104 and the mobile device 200 is greater than the retractive force of the spring 1304. Once the platform 104 is magnetically connected to the mobile device 200, the user may let go of the mobile device 200 to have both of the user's hands available to extend the handles 101, thus facilitating attachment of the mobile device 200 to the gaming device 1300. The configuration of FIGS. 13-16 may also include the features discussed above for FIGS. 4-12.

FIGS. 17-20 illustrate another mechanism for opening and closing a gaming device 1700, according to a fifth example configuration. Similar to the previous configuration, the platform 104 in this configuration includes a magnet structured to attract a mobile device, such as through a magnetic plate beneath the rear face of the mobile device. The platform 104 is pivotably connected to the bridge 106.

In the illustrated configuration, the bridge 106 comprises arms 1702 and arms 1704 that are rotatably connected at joints 1706. In configurations, arms 1704 are slidably connected to the platform 104. In the device's closed position, arms 1702 and arms 1704 may create an angle, and the platform 104 may sit above the plane of the handles 101, such as shown in FIG. 17. A user may bring their mobile device 200 near the platform 104, causing the magnet to attract the mobile device 200 and hold it in place on the platform 104. With the mobile device 200 in place on the platform 104, the user may then pull the handles 101 laterally away from each other (in the direction shown by the arrows in FIG. 18), causing the arms 1702 and arms 1704 to pivot and lower into a substantially horizontal position. Lowering the arms 1702 and the arms 1704 to substantially horizontal accordingly lowers the platform 104 into the same plane as the handles, such as shown in FIG. 19. When the platform 104 has been lowered, the handles 101 may then be retracted a small amount to secure the mobile device 200 in place for gameplay.

As described for various configurations above, the platform 104 may include a magnet structured to attract a rear surface of a user's mobile device. In configurations, the attraction utilizes internal magnetic technology within the mobile device, such as Apple MagSafe technology as applied to iPhones.

FIGS. 21-28 illustrate another mechanism, according to a sixth example configuration. As illustrated in FIGS. 21-28, the platform 104 may be secured to the gaming device 2100 via a pivot 2101, and two examples are shown.

FIGS. 21-24 illustrate the platform 104 being directly coupled to one of the handles 101 through a pivot 2101. In that regard, FIG. 21 is a bottom view of a handheld gaming device 2100 having a platform 104 that is pivotally connected to a handle 101 of the gaming device 2100. FIG. 22 is a bottom view of the handheld gaming device 2100, illustrating an example mobile device 200 being positioned for attachment to the platform 104, while the bridge 106 of the handheld gaming device 2100 is in a closed position. FIG. 23 is a bottom view of the handheld gaming device 2100, illustrating the example mobile device 200 coupled to the platform 104, while the bridge 106 of the handheld gaming device 2100 is in the closed position. FIG. 24 is a bottom view of the handheld gaming device 2100, illustrating the example mobile device 200 coupled to the platform 104, while the bridge 106 of the handheld gaming device 2100 is in an open position. The connection of the platform 104 to the handle 101 may be biased by a spring mechanism 2102 to a retracted configuration, such as shown in FIG. 24, where the platform 104 is substantially parallel to the bridge 106. As used in this context, "substantially parallel" means largely or essentially equidistant at all points, without requiring perfect parallelism. In other configurations, the connection to the handle 101 may be biased by a spring mechanism 2102 to an extended configuration, such as shown in FIG. 22, where the platform 104 is angled away from the bridge 106. The mobile device 200 may be coupled to the platform 104 through, for example, one or more magnets 2103.

FIGS. 25-28 illustrate the platform 104 being coupled to one of the handles 101 through a pivot 2502, with an additional link 2501 coupling the platform 104 to the pivot 2502. In that regard, FIG. 25 is a bottom view of a handheld gaming device 2500 having a platform 104 pivotally connected to a handle 101 of the gaming device 2500 through an additional link 2501. FIG. 26 is a bottom view of the handheld gaming device 2500, illustrating an example mobile device 200 being positioned for attachment to the platform 104, while the bridge 106 of the handheld gaming device 2500 is in a closed position. FIG. 27 is a bottom view of the handheld gaming device 2500, illustrating the example mobile device 200 coupled to the platform 104, while the bridge 106 of the handheld gaming device 2500 is in the closed position. FIG. 28 is a bottom view of the handheld gaming device 2500, illustrating the example mobile device 200 coupled to the platform 104, while the bridge 106 of the handheld gaming device 2500 is in an open position. The connection to the handle 101 may be biased by a spring mechanism 2503 to a retracted configuration, such as shown in FIG. 28, where the platform 104 and the additional link 2501 are each substantially parallel to the bridge 106. In other configurations, the connection to the handle 101 may be biased by a spring mechanism 2503 to an extended configuration, such as shown in FIG. 26, where the additional link 2501 is angled away from the bridge 106. In configurations, there may be spring mechanism at the pivot joint 2504 between the platform 104 and the additional link 2501. In configurations, there may be more than one additional link 2501 between the platform 104 and the pivot 2502. The mobile device 200 may be coupled to the platform 104 through, for example, one or more magnets 2505.

Configurations of the described invention improve the user experience for handheld gaming devices interfacing with mobile devices. Existing handheld gaming devices require forcing the device open before inserting the mobile device, which can pose difficulties for users performing both motions at once. Configurations described in this disclosure allow for default-open, force-close systems and separate the user's insertion of the mobile device and closure of the handles around the mobile device. Separating these motions not only makes use of the device easier, but it also prevents the potential for dropping and/or damaging either the mobile device or the device due to the described difficulties.

The previously described versions of the disclosed subject matter have many advantages that were either described or would be apparent to a person of ordinary skill. Even so, all of these advantages or features are not required in all versions of the disclosed apparatus, systems, or methods.

Additionally, this written description makes reference to particular features. It is to be understood that the disclosure in this specification includes all possible combinations of those particular features. For example, where a particular feature is disclosed in the context of a particular example configuration, that feature can also be used, to the extent possible, in the context of other example configurations.

Furthermore, the term "comprises" and its grammatical equivalents are used in this application to mean that other components, features, steps, processes, operations, etc. are optionally present. For example, an article "comprising" or "which comprises" components A, B, and C can contain only components A, B, and C, or it can contain components A, B, and C along with one or more other components.

Also, directions such as "vertical," "horizontal," "right," and "left" are used for convenience and in reference to the views provided in figures. But the gaming device may have a number of orientations in actual use. Thus, a feature that is vertical, horizontal, to the right, or to the left in the figures may not have that same orientation or direction in actual use.

Although specific example configurations have been described for purposes of illustration, it will be understood that various modifications may be made without departing from the spirit and scope of the disclosure.

The applicant intends to encompass within the language any structure presently existing or developed in the future that performs the same function.

We claim:

1. A handheld gaming device comprising:
   a first handle comprising a first user-accessible hardware interface;
   a second handle comprising a second user-accessible hardware interface;
   a platform;
   a first arm associated with the first handle and rotatably connected with the platform at a first pivot point;
   a second arm associated with the second handle and rotatably connected with the platform at a second pivot point; and
   a connector on one of the first and second handles, the connector configured to electronically connect to an input port of a mobile device;
   wherein:
      when the first and second arms are rotated to a first position, the first and second handles are slidably movable between a first extended position and a second extended position;
      in the first extended position, a length between the first and second handles is longer than a length of the mobile device; and
      in the second extended position, the length between the first and second handles is about the length of the mobile device.

2. The handheld gaming device of claim 1, wherein the first and second arms are rotatably connected at a bottom of the platform.

3. The handheld gaming device of claim 1, wherein the first arm is rotatably connected at an edge of the platform.

4. The handheld gaming device of claim 1, wherein the first arm is coupled with the first handle via a first additional arm that is fixed to the first handle, and wherein the first additional arm is rotatably connected with the first arm.

5. The handheld gaming device of claim 4, wherein the second arm is coupled with the second handle via a second additional arm that is fixed to the second handle, and wherein the second additional arm is rotatably connected with the second arm.

6. The handheld gaming device of claim 1, wherein the platform comprises a magnet.

7. The handheld gaming device of claim 1, wherein the first and second handles comprise respective compliant linings configured to cushion and grip edges of the mobile device.

8. The handheld gaming device of claim 1, wherein the first and second handles comprise respective overhangs.

9. The handheld gaming device of claim 1, wherein the first and second user-accessible hardware interfaces each comprise one or more of a button, an analog stick, a touchscreen, a touch pad, a knob, a slider, a switch, a wheel, a dial, a directional pad, a finger touch input, or a stylus touch input.

10. The handheld gaming device of claim 1, wherein:
    the first user-accessible hardware interface comprises a first joystick, a directional pad positioned below the first joystick, and a first set of diagonally-arranged buttons positioned below the directional pad; and
    the second user-accessible hardware interface comprises four buttons arranged in a diamond pattern, a second joystick positioned below the four buttons, and a second set of diagonally-arranged buttons positioned below the second joystick.

11. The handheld gaming device of claim 1, wherein a length of the platform is less than a length of the mobile device.

12. The handheld gaming device of claim 1, wherein the platform is positioned between inside edges of the first and second handles when the first and second arms are rotated to the first position.

13. The handheld gaming device of claim 1, wherein an overall length of the handheld gaming device is reduced when the first and second arms are rotated to a second position as compared to when the first and second arms are rotated to the first position.

14. A handheld gaming device comprising:
    a first handle comprising a first user-accessible hardware interface;
    a second handle comprising a second user-accessible hardware interface; and
    a plurality of pivotable arms coupling the first and second handles, wherein the plurality of pivotable arms are movable between an angled position and a substantially-horizontal position;
    wherein the mobile device is receivable between the first and second handles when the plurality of pivotable arms are in the substantially-horizontal position.

15. The handheld gaming device of claim 14, wherein an overall length of the handheld gaming device is reduced when the plurality of pivotable arms are in the angled position as compared to when the plurality of pivotable arms are in the substantially-horizontal position.

16. The handheld gaming device of claim 14, wherein the first and second handles are slidably movable between a first extended position and a second extended position.

17. The handheld gaming device of claim 14, further comprising a platform, wherein ends of two of the plurality of pivotable arms are rotatably connected with the platform.

18. The handheld gaming device of claim 17, wherein ends of two of the plurality of pivotable arms are rotatably connected at a bottom of the platform.

19. The handheld gaming device of claim 14, further comprising a connector on one of the first and second handles, wherein the connector is configured to electronically connect to an input port of the mobile device.

20. The handheld gaming device of claim 14, wherein the first and second handles comprise respective compliant linings configured to cushion and grip edges of the mobile device.

21. The handheld gaming device of claim 14, wherein the first and second handles comprise respective overhangs.

22. A handheld gaming device comprising:
    a first handle comprising a first user-accessible hardware interface;
    a second handle comprising a second user-accessible hardware interface, wherein the first and second handles are slidably movable between a first position and a second position;
    a first arm coupled with the first handle and rotatably connected with the platform at a first pivot point;
    a second arm coupled with the second handle and rotatably connected with the platform at a second pivot point;
    a mobile device support surface, wherein the mobile device support surface is positioned between inside edges of the first and second handles when the first and second arms are rotated to a first position; and
    an electrical connector on one of the first and second handles, wherein the electrical connector is configured to mate with a mobile device port.

23. The handheld gaming device of claim 22, wherein the first and second arms are rotatably connected at a bottom of the mobile device support surface.

24. The handheld gaming device of claim 22, wherein the first arm is rotatably connected at an edge of the mobile device support surface.

25. The handheld gaming device of claim 22, wherein the first arm is coupled with the first handle via a first additional arm that is coupled with the first handle, wherein the first additional arm is rotatably connected with the first arm.

26. The handheld gaming device of claim 22, wherein the second arm is coupled with the second handle via a second additional arm that is coupled with the second handle, wherein the second additional arm is rotatably connected with the second arm.

27. The handheld gaming device of claim 22, wherein the mobile device support surface comprises a magnet.

28. The handheld gaming device of claim 22, wherein the first and second handles comprise respective compliant linings.

29. The handheld gaming device of claim 22, wherein the first and second handles comprise respective overhangs.

* * * * *